US008249383B2

(12) United States Patent
Catravas

(10) Patent No.: US 8,249,383 B2
(45) Date of Patent: Aug. 21, 2012

(54) SYSTEM AND METHOD FOR TRANSFORMING DISPERSED DATA PATTERNS INTO MOVING OBJECTS

(76) Inventor: Palmyra Catravas, Schenectady, NY (US)

( * ) Notice: Subject to any disclaimer, the term of this patent is extended or adjusted under 35 U.S.C. 154(b) by 1135 days.

(21) Appl. No.: 12/030,177

(22) Filed: Feb. 12, 2008

(65) Prior Publication Data
US 2008/0204458 A1 Aug. 28, 2008

Related U.S. Application Data

(60) Provisional application No. 60/900,715, filed on Feb. 12, 2007, provisional application No. 60/907,552, filed on Apr. 6, 2007, provisional application No. 60/979,124, filed on Oct. 11, 2007.

(51) Int. Cl.
*G06K 9/36* (2006.01)
*G06T 13/00* (2011.01)
(52) U.S. Cl. ........................................ 382/276; 345/474
(58) Field of Classification Search .................. 382/276, 382/280; 345/474
See application file for complete search history.

(56) References Cited

U.S. PATENT DOCUMENTS

| | | | | |
|---|---|---|---|---|
| 2001/0036304 | A1* | 11/2001 | Yang et al. | 382/132 |
| 2004/0264917 | A1* | 12/2004 | Braun et al. | 386/46 |
| 2005/0171700 | A1* | 8/2005 | Dean | 702/16 |
| 2008/0022842 | A1* | 1/2008 | Lemons | 84/483.2 |

OTHER PUBLICATIONS

A. Askenfelt et al., "Study of the Spectral Inharmonicity of Musical Sound by the Algorithms of Pitch Extraction," Acoustical Physics, vol. 46, No. 2, 2000, pp. 121-132.
Balázs Bank et al., "Generation of Longitudinal Vibrations in Piano Strings: From Physics to Sound Synthesis," J. Acoust. Soc. Am. 117(4), Pt. 1, Apr. 2005, pp. 2268-2278.
Lyn Bartram, "Perceptual and Interpretative Properties of Motion for Information Visualization," Graphics and Multimedia Research Lab, pp. 3-7, 1997.
Richard A. Becker et al., "Dynamic Graphics for Data Analysis," Statistical Science, 1987, vol. 2, No. 4, pp. 355-395.
John V. Carlis et al., "Interactive Visualization of Serial Periodic Data," 11th Annual Symposium on User Interface Software and Technology, Nov. 1-14, 1998, pp. 29-38.
Palmyra Catravas, "Tracking Harmonics and Artifact in Spectra using Sinusoidal and Spiral Maps," Audio Engineering Society, Convention Paper 7123, 122nd Convention, May 5-8, 2007, pp. 1472-1478.
Palmyra Catravas, "Seeing the B-A-C-H Motif (Abstract)," J. Acoust. Soc. Am., vol. 118, No. 3, Pt. 2, Sep. 2005, p. 1949.

(Continued)

*Primary Examiner* — Yubin Hung
(74) *Attorney, Agent, or Firm* — Nixon Peabody LLP

(57) ABSTRACT

A motion-based method and system for rapidly identifying the presence of spatially dispersed or interwoven patterns in data and their deviation from a test model for the pattern includes transforming dispersed patterns into one concentrated moving objects, for which there is a characteristic, identifiable motion signature. The method may be used with data sets containing sharp peaks, such as frequency spectra, and other data sets. A roadmap of basic motion signatures is provided for reference, including multiple harmonic series, separation of odd and even harmonics, missing modes, sidebands and inharmonic patterns. The system and method may also be used with data stored in arrays and volumes. It remaps such data to show both high-resolution information and long range trends simultaneously for applications in nanoscale imaging.

20 Claims, 15 Drawing Sheets

OTHER PUBLICATIONS

Palmyra Catravas, "Keyboard Characterization using Spiral and Cartesian Mappings of the Harmonic Series," J. Acoust. Soc. Am., vol. 119, No. 5, Pt. 2, May 2006, p. 3383.

Palmyra Catravas, "A Graphical, Motion-Based Method for Exploring Spectra Containing Harmonics, Sidebands and Other Patterns," Audio Engineering Society Convention Paper 7286, 123$^{rd}$ Convention, Oct. 5-8, 2007, pp. 1-10.

Elaine Chew et al., "Real-Time Pitch Spelling Using the Spiral Array," Computer Music Journal, 29:2, Summer 2005, pp. 61-76.

Elaine Chew, "Slicing It All Ways: Mathematical Models for Tonal Induction, Approximation, and Segmentation Using the Spiral Array", INFORMS *Journal on Computing*, vol. 18, No. 3, Summer 2006, pp. 305-320.

D.L. Donoho et al., "Kinematic Display of Multivariate Data", from William S. Cleveland et al., *"Dynamic Graphics for Statistics,"* pp. 111-119, 1988.

William S. Cleveland, "Application of the Paradigm to Data Display," The Elements of Graphing Data, 1985, pp. 255-293.

Neville H. Fletcher et al., "12.6 Sound Decay: Interaction of Strings, Bridge, and Soundboard," The Physics of Musical Instruments, Second Edition, pp. 383-389, 1998.

Wolfgang J. Hess, "Manual and Instrumental Pitch Determination, Voicing Determination," "Pitch Determination of Speech Signals Algorithms and Devices", pp. 92-151, 1983.

Harold A. Conklin, Jr., "Piano Strings and 'Phantom' Partials," J. Acoust. Soc. Am., vol. 102 (1), Jul. 1997, pp. 659.

Dennis R. Cook et al., "Regression Diagnostics With Dynamic Graphics," Technometrics, 1989 American Statistical Association and the American Society for Quality Control, Aug. 1989, vol. 31, No. 3, pp. 277-291.

Alexander Galembo et al., Signal Representation and Estimation of Spectral Parameters by Inharmonic Comb Filters with Application to the Piano,, IEEE Transactions on Speech and Audio Processing, vol. 7, No. 2, Mar. 1999, pp. 197-203.

David Gerhard, "Pitch Extraction and Fundamental Frequency: History and Current Techniques," Technical Report TR-CS 2003-06, Nov. 2003, pp. 1-22.

William M. Hartmann, "Session W. Musical Acoustics II: Musical Instruments," J. Acoust. Soc. Am., vol. 63, Suppl. No. 1, Spring 1978, pp. S56-S57.

Daniel E. Huber et al., "Visualizing Data with Motion," IEEE Visualization 2005, Oct. 23-28, 2005, pp. 527-534.

Daniel A. Keim, "Information Visualization Visual Data Mining," IEEE Transactions on Visualization and Computer Graphics, vol. 8, No. 1, Jan.-Mar. 2002, pp. 1-8.

Wolfgang Klippel et al., "Measurement and Visualization of Loudspeaker Cone Vibration," Audio Engineering Society Convention Paper 6882, 121$^{st}$ Convention, Oct. 5-8, 2006, pp. 1-18.

Wolfgang Klippel, "Tutorial: Loudspeaker Nonlinearities—Causes, Parameters, Symptoms," J. Audio Eng. Soc., vol. 54, No. 10, Oct. 2006, pp. 907-939.

Gordon Monro et al., "Sound Visualization Using Embedding: The Art and Science of Auditory Autocorrelation," Computer Music Journal, vol. 22, No. 2, Summer 1998, pp. 20-34.

Wolfgang Müller et al., "Visualization Methods for Time-Dependent Data—An Overview," Proceedings of the 2003 Winter Simulation Conference, 2003, pp. 737-745.

Clifford A. Pickover, "On the Use of Symmetrized Dot Patterns for the Visual Characterization of Speech Waveforms and Other Sampled Data", J. Acoust. Soc. Am. vol. 80, No. 3, Sep. 1986, pp. 955-960.

A.G. Pikler, "History and Theory of the Tonal Spiral," The Journal of the Acoustical Society of America, vol. 40, No. 5, Nov. 1966, pp. 1253.

L. Rossi et al., "5pMU2. A Novel Approach for Identifying Polyphonic Piano Signals," J. Acoust. Soc. Am., vol. 100, No. 4, Pt. 2, Oct. 1996, pp. 2842.

C.A. Ruckmick, "A New Classification of Tonal Qualities," *Psychological Review*, vol. 36, No. 1929, pp. 172-180.

Roger N. Shepard, "Multidimensional Scaling, Tree-Fitting, and Clustering," Science Magazine, vol. 210, Oct. 24, 1980, pp. 390-398.

Roger N. Shepard, "Structural Representations of Musical Pitch," The Psychology of Music, D. Deutsch, Ed., Academic Press, 1982, pp. 344-390.

Sonia Fernandes Silva et al., "Visualization of Linear Time-Oriented Data: A Survey," Proc. of the First Intl. Conf. on Web Information Systems Engineering, vol. 1, 2000, 310-319.

Pawan Sinha, "Parsing Visual Scenes Via Dynamic Cues," Journal of Vision, vol. 6, No. 6, Abstract 95, p. 95a, 2006.

J.W. Turkey et al., "Data Analysis and Statistics: Techniques and Approaches," Proceedings of the Symposium on Information Processing in Sight Sensory Systems, California Institute of Technology, 1965, pp. 7-27, 1965.

J.W. Turkey, "Some Graphic and Semigraphic Displays", *Statistical Papers in Honor of George W. Snedecor*, T.A. Bancroft, The Iowa State University Press, 1972, pp. 293-316.

Alexander Voishvillo et al., "Graphing, Interpretation, and Comparison of Results of Loudspeaker Nonlinear Distortion Measurements," J. Audio Eng. Soc., vol. 52, No. 4, Apr. 2004, pp. 332-357.

M. Weber et al., "Visualizing Time-Series on Spirals," *Proceedings of the IEEE Symposium on Information Visualization*, 2001, pp. 7-13.

G. Weinreich, "Coupled Piano Strings," *Journal of the Acoustical Society of America*, vol. 63, Suppl. No. 1, Spring 1989, pp. 56-57.

M. Wertheimer, "Laws of Organization in Perceptual Forms," W. Ellis, Ed., *A Source Book of Gestalt Psychology*, 1923, pp. 71-88.

Robert G. Yaccarino et al., "Linear Spiral Sampling for the Bipolar Planar Near-Field Antenna Measurement Technique," *IEEE Trans. On Antennas and Propagation*, vol. 44, No. 7, Jul. 1996, pp. 1049-1051.

Woon Sueng Yeo et al., "SonART: A Framework for Data Sonification, Visualization, and Networked Multimedia Applications," *Proceedings of the 2004 International Computer Music Conference (ICMC 2004)*, Nov. 1, 2004, pp. 323-327.

Woon Sueng Yeo et al., "Raster Scanning: A New Approach to Image Sonification, Sound visualization, Sound Analysis, and Synthesis," *Proceedings of the 9$^{th}$ International Conference on Digital Audio Effects (DAFx-06)*, Sep. 18, 2006.

Woon Sueng Yeo et al., "Application of Raster Scanning Method to Image Sonification, Sound Visualization, Sound Analysis and Synthesis," *Proceedings of the 9$^{th}$ International Conference on Digital Audio Effects (DAFx-06)*, Sep. 18, 2006, pp. 309-314.

Woon Sueng Yeo et al., "Application of Image Sonification Methods to Music," *Proceedings of the 2005 International Computer Music Conference (ICMC 2005)*, Sep. 5, 2005, pp. 219-222.

Woon Sueng Yeo et al., "A Framework for Designing Image Sonification Methods," *Proceedings of the 2005 International Conference on Auditory Display (ICAD 2005)*, Jul. 6, 2005, pp. 323-327.

E. Yudilevich et al., "Spiral sampling: Theory and an Application to Magnetic Resonance Imaging," *Journal of the Acoustical Society of America*, Apr. 1998, vol. 5, No. 4, pp. 542-553.

\* cited by examiner

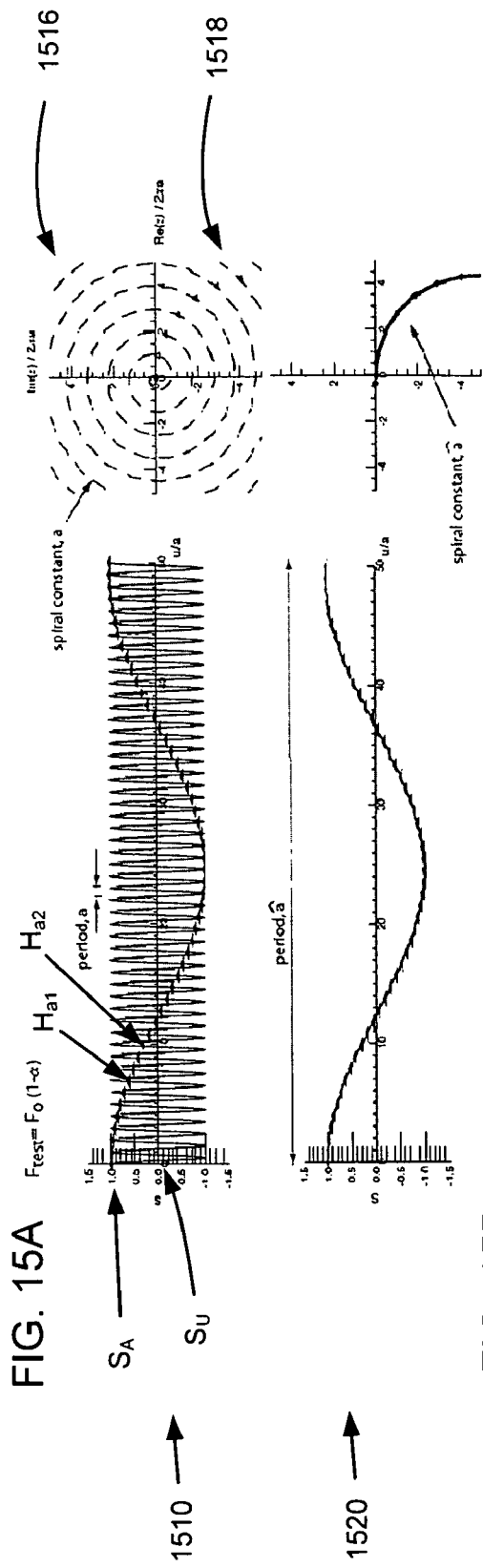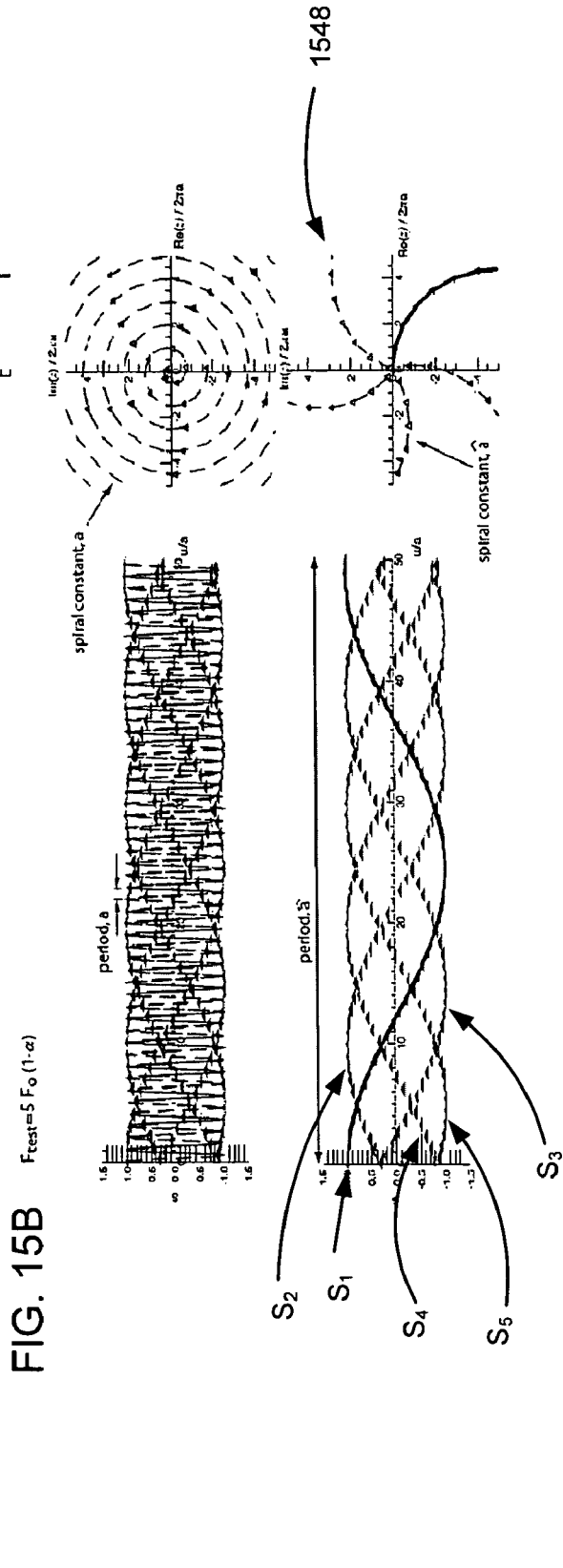

SYSTEM AND METHOD FOR TRANSFORMING DISPERSED DATA PATTERNS INTO MOVING OBJECTS

CROSS-REFERENCE TO RELATED APPLICATIONS

The present application claims the benefit of priority of U.S. Provisional Patent Application Ser. No. 60/900,715 entitled "A Graphical System and Method for Identifying and Characterizing Spectra Containing Harmonics" filed on Feb. 12, 2007. The present application also claims the benefit of priority of U.S. Provisional Patent Application Ser. No. 60/907,552 entitled "Graphical Technique for Exploring Spectra Containing Harmonics and Other Spectral Patterns" filed on Apr. 6, 2007. The present application also claims the benefit of priority of U.S. Provisional Patent Application Ser. No. 60/979,124 entitled "A Graphical, Motion-Based Method for Exploring Spectra Containing Harmonics, Sidebands, and Other Patterns" filed on Oct. 11, 2007. These provisional applications are incorporated by reference in their entirety.

FIELD OF THE INVENTION

The present invention is directed to a motion-based method and system for rapidly identifying the presence of patterns and deviations in data representations. Particularly, the present invention is directed to enhancing visual recognition of systematic effects upon data patterns using motion enhancement techniques to identify simultaneously high-resolution characteristics and long-range trends.

BACKGROUND OF THE INVENTION

A rustle in the bushes or a movement in the grass that cannot be audibly perceived provides visual cues based upon the motion of the leaves or movement of the grass. Image representations, such as shapes, size, color, position, and others, effectively prime the pre-attentive process of the human visual system.

Visual items often consist of regions that differ in color, luminance, size, and shape. The human visual system is adept at binding together these various regions to perceive the whole object, while simultaneously separating the regions from those that belong to other objects or to the background. The human visual system parses the regions and recognizes whole objects. Motion cues play a significant role in the process of recognizing objects. Objects that are substantially similar to other objects within a field of vision are more difficult to discern. Motion cues enable integration of regions within an object as well as the ability to separate the object from the background. Additionally, motion cues facilitate development of object representations, which permit recognition in static images. Motion information plays a fundamental role in organizing the visual experience and in assisting a viewer in both integrating regions within an object and in separating one object from another or from a background.

Standard data displays do not fully utilize the exceptional ability of the human visual processing system to respond to motion cues. Moreover, standard techniques often display patterns with 1) spatial interruptions; or 2) spatially separation in the display. Long, stretched out representations of data are not ideal for the visual identification or separation of multiple, interwoven patterns. Even in the case of a single pattern, small systematic deviations from a trial model for the pattern become hard to judge from an extended, stretched-out representation. Paradoxically, a standard x-y plot can exhibit these problems even when the underlying data contains elegant symmetry. These representation problems may be indicative that the visualization technique itself may be unnecessarily encumbering the processes of data exploration, hypothesis generation and analysis. Addressing this type of visualization bottleneck ameliorates a viewer's ability to explore and present global trends in data, and to avoid limiting the presentation to a small, localized window when comparing experimental data with modeled data behaviors.

Dynamic graphics may be incorporated into data analysis, including dynamic regression analysis. However, for data involving strongly interwoven patterns, the residuals with respect to a model for the pattern become difficult to calculate. To calculate these residuals, numerical algorithms have been used. However, by introducing numerical algorithms as an intermediate step in the analysis, there are risks for error. For example, when using numerical algorithms, one might make a priori assumptions about trends in the data, or introduce errors in performing peak fitting. A direct, rapid way to produce the dynamic regression plot without calculating the residuals is needed.

The extent to which an imperfect visual display is relied upon in the process of in setting up the numerical algorithm creates a circular problem, and is also frequently overlooked. An advanced repertoire of numerical algorithms exists for analyzing data containing patterns of peaks. For example, such algorithms may be applied to audio and speech analysis. These algorithms often operate by reducing the data to a single number or perhaps a few numbers (such as a set of fundamental frequencies), but in doing so hide complex relationships in the data. In the case where knowledge of the trends in the data that contribute to the final output is important to the user, reduction of the data to a single number overprojects the data. As a result, when working with the numerical algorithms, such as in debugging, in developing, and in other environments, one typically uses an x-y plot of the raw data in an attempt to monitor the trends, which in turn produces the bottlenecks described above, namely spatial separation and spatial interruption of patterns. Some numerical algorithms produce results that are directly shown in x-y plot form, such as cepstrum, autocorrelation, and the like, and these processes exhibit these same problems. Data analyzed via the short time Fourier transform are presented in 2-D. However, patterns are spatially separated along the y-axis.

Mappings may be used to transform visual proximity. In acoustics and psychoacoustics research, mappings of pitch onto cyclic curves are used to increase the proximity of members of a given pitch class. A variety of different mappings have been developed, from the Pythagorean spiral of fifths to the helical representation of pitch defined by Drobisch as well as those discussed by Ruckmick, and in the study and family of mappings constructed by R. N. Shepard, which includes a three dimensional toroidal map. Pikler presented a historical perspective of pitch-related computations utilizing spirals and reviewed the work of Ptolemy and others. Pikler also reported new developments and experimented with the imaginary domain. More recently, Chew created the "Spiral Array", and has explored pitch spelling applications. However, all of these techniques focus on musical pitch and tend to spatially disperse patterns in spectral harmonics, as they are optimized for a different set of applications. Further, these techniques do not include motion to organize the visual experience and to assist a viewer in both integrating regions within an object and in separating one object from another or from a background.

Another manner of increasing the proximity of stretched-out serial data is raster scanning. Raster scanning is an example of transforming serial data so that proximity of stretched-out patterns is increased. Early work performed by Lashinsky produced raster plots of spectra using an experimental setup that integrated a spectrum analyzer with an oscilloscope, using the latter to produce the final display. Lashinsky's technique seeks periodicity in spectral data and was used to display patterns of harmonics in spectra. However, this scheme not only does not incorporate motion, but removes it through its triggering method. For sufficiently tangled spectra, static displays can leave patterns hidden even when they remap the data to increase proximity.

When a frequency spectrum or block of data is presented in serial form, real effects may exist within the spectrum or block of data that are difficult for the eye to perceive. Graphical transformations of the data may better illustrate these effects and enhance the process of data exploration and algorithm development. Long, stretched-out serial visual patterns are easier to recognize and compare as compact objects.

Motion cues facilitate development of object representations, but efforts to date have not successfully incorporated motion with compact objects to provide recognition.

Efforts to date to improve the ability to recognize and characterize patterns within data presentations have been largely unsuccessful in providing graphical techniques that provide visual recognition of systematic frequency effects and data patterns. Efforts aimed at improving the ability to accurately identify harmonics, spectral features, and other data patterns have not provided satisfactory results. What is needed is a system and a method for accurately identifying data patterns using compact data and motion enhancement to provide visual recognition of frequency effects and data patterns.

SUMMARY OF THE INVENTION

The system and method of the present invention spatially compacts patterns in data sets and transforms them to moving objects in a visual display, thereby changing the manner in which they are recognized. When the objects move, they become easier to recognize. The present invention incorporates a graphical transformation of data sets, including serial data and blocks of data, including arrays of data, and volumetric data. The system and method of the present invention is used to address visualization bottlenecks that arise when patterns are spatially interwoven and/or spatially separated in a display.

Frequency spectra are an example of a data set that often contains interwoven spectral patterns. The spectra of polyphonic music, for example, have overtone sequences that interrupt each other when presented sequentially. The appearance of sidebands around families of harmonics produces similar interweaving of related groups of spectral peaks. Even for a single overtone series, the relative change in separation between a pair of partials close to the fundamental and a pair of partials at a higher frequency is difficult to judge because the lines or segments to compare sit far apart in the display. As such, spectra serve to illustrate visualization bottlenecks as spectral patterns are spatially interrupted or spatially separated with respect to the viewer.

Outputs of numerical algorithms that are typically presented in the form of a contour plot (such as the Short Time Fourier Transform, for example) and microscopy images (such as those taken with electron or scanning probe microscopes, as examples) are examples of data sets that are saved as arrays of data and may contain patterns that are interwoven and/or spatially dispersed in the display. Nanoscale microscopy images illustrate a particular kind of visualization bottleneck. The choice must often be made between a high resolution image, in which long range trend information is lost, or a low resolution image which contains the trend information, but perhaps displays it in a visually inefficient manner.

The system and method of the present invention is used to analyze such data and to demonstrate a manner in which compacting the data set and employing motion effects is used to untangle patterns in the data. Specifically, the system and method of the present invention is used to analyze spectra and other data sets, including serial data, arrays of data, and volumetric data, and demonstrates compacting the data set and employing motion effects to untangle spectral and other data patterns.

The system and method of the present invention extends data recognition techniques and provides an improved view of the distributions of patterns after spatially compacting the data and transforming patterns into moving objects for improved recognition.

The system and method of the present invention offers an efficient manner of rapidly producing a dynamic regression plot directly from serial data without calculating the residuals that avoids a number of sources of error introduced by other techniques. When calculation of residuals is bypassed, the number of a priori assumptions needed to create the plots is reduced. The index (i.e. partial number) associated with each peak in the data does not need to be known in advance. This offers significant advantages when several types of patterns, each with its own set of indices, are interwoven. The technique differs from residual plotting in that multiple reference lines are used—not just the x-axis. Additionally, non-uniform mappings may be used to produce additional reference curves. The system and method of the present invention introduces redundancy that is not normally present in a residual plot, but the redundancy can be optionally avoided by limiting the plot range. Further dimensions of information are included than in a typical residual plot. Namely, the information of intensity as well as the peak positions are also contained in the plots Signatures of effects associated with the spectra and with the harmonics are identified and characterized. Multiple harmonic series in the spectra, odd and even harmonics, and missing modes are mapped in interpretable forms in a rectangular coordinate system. For example, the spectra and the harmonics may be mapped in an x-y plane, in a three-dimensional rectangular coordinate system, in a polar coordinate system, and the like. For applications in audio signal processing, the methods of the present invention may be used in tandem with quantitative techniques, such as comb filtering and other fundamental frequency and polyphonic pitch identification methods.

A method of the present invention is used to analyze data sets and to untangle patterns in the data by compacting the data set and employing motion effects to visualize the data patterns. The system and method of the present invention is used to analyze spectra and other data sets, including serial data, arrays of data, and volumetric data. For example, a method of the present invention transforms a frequency spectrum data set from a frequency space to an animated coordinate space, such as a rectangular coordinate system, a polar coordinate system, and the like. The method includes mapping a frequency axis onto a curve, mapping a value of a function of the frequency spectrum data set onto a third dimensional axis of the rectangular coordinate space, and scanning the map to produce an animated contour plot sequence in the rectangular coordinate space.

Mapping the frequency axis onto a curve may include replicating the frequency spectrum into a plurality of lines, aligning the plurality of lines in parallel in the rectangular coordinate space such that the last line intercepts the horizontal axis of the rectangular coordinate space at a horizontal coordinate equal to the number of the plurality of lines, and shifting each line by an amount that is a function of the number of lines in the plurality of lines to map a target spectral sequence along the horizontal axis of the rectangular coordinate space.

The curve may be displayed in an x-y plane with a horizontal x-axis and a vertical y-axis, as well as in other coordinate systems. Additionally, the vertical axis may be limited to avoid redundancy in the contour plot sequence. The target spectral peak sequences may be mapped along the x-axis with additional target spectral peak sequences positioned consecutively along the x-axis. Further, the value of a function of frequency may be a Fourier transform amplitude, phase, power, spectral density, or other values. The lines may be of equal length and may be shifted by an amount that is a function of the frequency function. Additionally, the lines may be aligned vertically.

A example system in accordance with the present invention transforms a frequency spectrum data set from a frequency space to an animated coordinate space, such as a rectangular coordinate system, a polar coordinate system, and the like. The system includes a frequency axis mapping module that maps a frequency axis onto a curve, a frequency function mapping module that maps a value of a function of the frequency spectrum data set onto a third dimensional axis of the coordinate space, and a scanning module that scans a parameter to produce an animated contour plot sequence in the coordinate space.

The frequency axis mapping module may include a curve definition module that replicates the frequency spectrum into a plurality of lines, where the plurality of lines including at least a first line and a last line, and a shifting module that aligns the plurality of lines in parallel in the rectangular coordinate space such that the last line intercepts the horizontal axis of the rectangular coordinate space at a horizontal coordinate equal to the number of the plurality of lines and wherein each line is shifted by an amount that is a function of the number of lines.

The frequency axis mapping module may display the curve in an x-y plane with a horizontal x-axis and a vertical y-axis, as well as in other coordinate systems. Additionally, the frequency axis mapping module may further map target spectral peak sequences along the x-axis and position additional target spectral peak sequences consecutively along the x-axis.

Also, the curve definition module may replicate the plurality of lines into equal lengths to normalize the frequency axis. Additionally, the frequency function mapping module may map the value of a function of frequency in the frequency spectrum that is Fourier transform amplitude, phase, power, spectral density, or other values.

In accordance with one embodiment of the present invention, the system and method of the present invention compacts data. Data that is a function of a single variable is mapped onto a curve in the x-y plane so the target sequence in the data appears along the x-axis. Parametric equations are used to describe the transformation. The method of transforming the frequency spectrum from a frequency space to another coordinate system may be implemented by mapping this data multiple times onto a set of parallel lines and shifting each line so that it intercepts the x-axis in a target sequence of shift values. In the case where the data is a function of frequency (such as Fourier transform amplitude, phase, power spectral density, etc.) may be assigned to the z-axis. Scanning the definition of the target sequence of shift values produces an animated contour plot sequence that is readily perceptible and may be efficiently identified and characterized.

When the data is in the form of an array of values, the method of transforming the array may be implemented by mapping the array multiple times so that it is centered about the set of parallel lines, and shifting each array so that it intercepts the x-axis using a target sequence of shift values. When the data is in the form of a volume of values, each volume is mapped multiple times so that it is centered about a set of parallel lines in two dimensions, and each volume is shifted so that it that intercepts the x-y plane using a target array of shift values. Scanning the definition of the target array of shift values produces motion.

BRIEF DESCRIPTION OF THE DRAWINGS

The accompanying drawings illustrate an embodiment of the invention and depict the above-mentioned and other features of this invention and the manner of attaining them. In the drawings:

FIG. 15 illustrates an underlying sinusoid and an alias sinusoid and corresponding spiral mappings in accordance with the present invention.

DETAILED DESCRIPTION OF THE INVENTION

Figure 1:
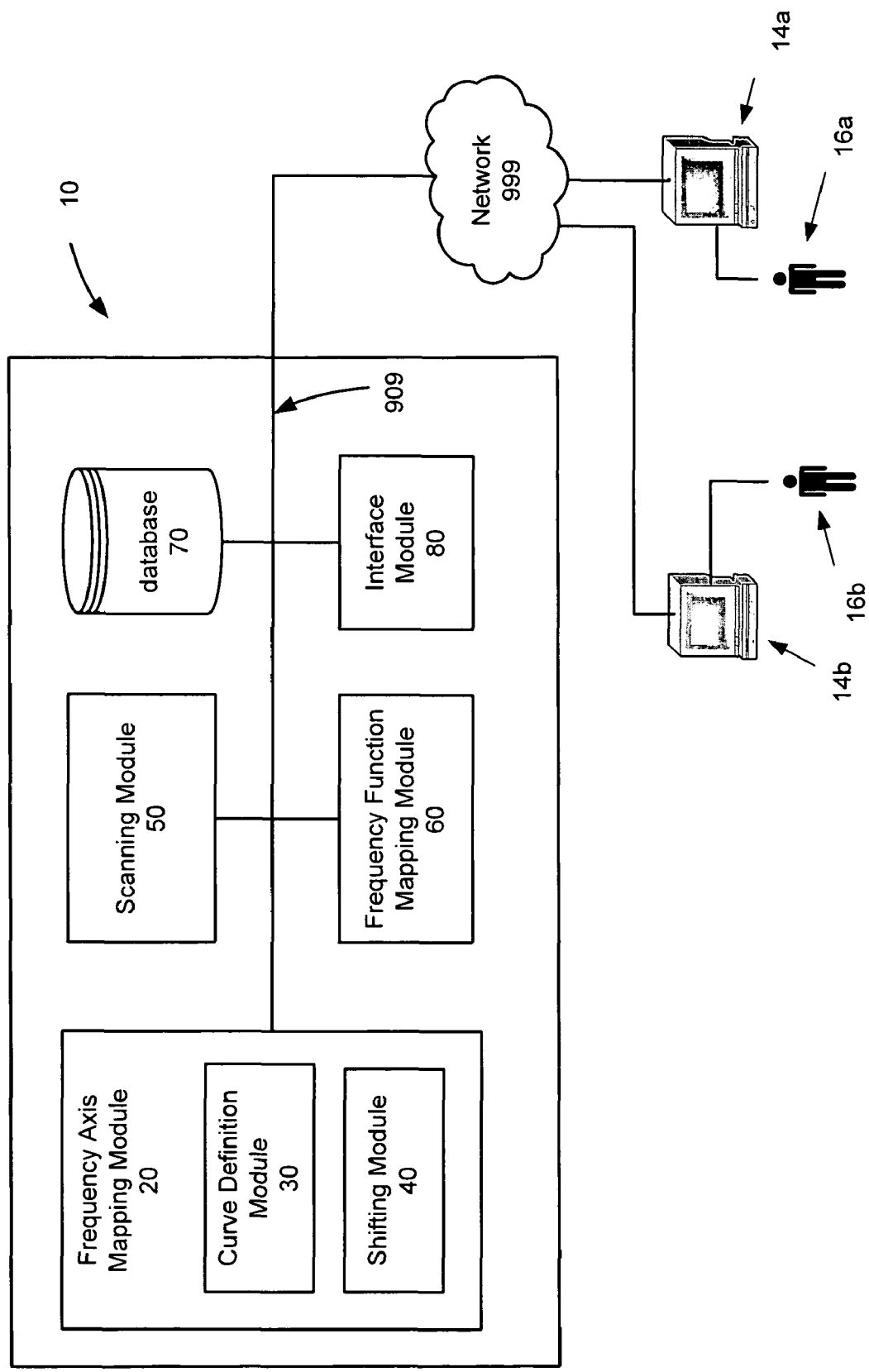
FIG. 1 is a schematic illustration of a data transforming system in accordance with one embodiment of the present invention.

FIG. 1 is a schematic illustration of a data transforming system 10 in accordance with one embodiment of the present invention. In accordance with the illustrated embodiment, the data transforming system 10 is provided with a frequency axis mapping module 20 that is adapted to map a frequency axis onto a curve. Frequency axis mapping module 20 includes optional curve definition module 30 and shifting module 40. Curve definition module 30 is adapted to replicate a frequency spectrum into a plurality of lines, including at least a first line and a last line. Shifting module 40 is adapted to align the last line vertically in a rectangular coordinate system such that the last line intercepts the horizontal axis of the rectangular coordinate system at a horizontal coordinate equal to the number of lines. Shifting module 40 is also adapted to center the lines about the horizontal axis of the rectangular coordinate system.

Additionally, data transforming system 10 includes frequency function mapping module 60 adapted to map a value of a function of the frequency spectrum onto a third dimensional axis of the rectangular coordinate system. Data transforming system 10 also includes scanning module 50 adapted to scan the frequency spectrum to produce an animated contour plot sequence in the rectangular coordinate system.

Data transforming system 10 of FIG. 1 may be implemented with any type of hardware and software, and may be a pre-programmed general purpose computing device. For example, the data transforming system 10 may be implemented using a server, a personal computer, a portable computer, a thin terminal, a hand held device, a wireless device, or any combination of such devices. The data transforming system 10 may be a single device at a single location or multiple devices at a single location, or multiple devices at multiple locations that are connected together using any appropriate communication protocols over any communication medium such as electric cable, fiber optic cable, any other cable, or in a wireless manner using radio frequency, infrared, or other technologies.

In the illustrated embodiment, the data transforming system 10 a frequency transforming system and is connected to a network 999 that allows remote access to the frequency transforming system so that frequency information may be entered on terminals 14a, 14b and so that analysis may be conducted by users 16a, 16b that are remote from the frequency transforming system. This configuration also provides an efficient manner in which users 16a, 16b may collaborate by sharing data and results of analyses. Additionally, frequency spectra data and analysis results may be stored in database 70 to provide searchable and retrievable records with which users 16a, 16b may perform additional analyses or may be used to verify additional measurements.

The network 999 allows the data transforming system 10 to interact with terminals 14a, 14b, which may be proximate to data transforming system 10 or which may be remotely located from data transforming system 10. Regardless of their location, terminals 14a, 14b are utilized by users 16a, 16b. The network 999 may be any type of communications channel, such as the Internet, a local area network (LAN), a wide area network (WAN), direct computer connections, and the like, and may be connected in a wireless manner using radio frequency, infrared, or other communication technologies, using any type of communication hardware and protocols. The terminals 14a, 14b may be implemented using a server, a personal computer, a portable computer, a thin terminal, a hand held device, a wireless device, and any other computing devices, or any combination of such devices.

It should also be noted that the data transforming system 10 in accordance with one embodiment of the present invention is illustrated and discussed herein as having a plurality of modules and/or components that perform particular functions. It should be understood that these modules are merely schematically illustrated based on their function for clarity purposes only, and do not necessary represent specific hardware or software. In this regard, these modules and/or submodules may be implemented as hardware and/or software to substantially perform the particular functions explained. Moreover, two or more of these modules may be combined together within the data transforming system 10, or divided into more modules based on the particular function desired. Thus, the present invention as schematically embodied in FIG. 1 should not be construed to limit the data transforming system 10 of the present invention.

In the above regard, the data transforming system 10 in accordance with the illustrated embodiment also includes an interface module 80 that allows the users 16a, 16b to easily enter frequency spectra data and perform analyses on the frequency data via terminals 14a, 14b. Similarly, interface module 80 provides an input and output pathway from users 16a, 16b and data transforming system 10. In this regard, the interface module 80 includes a graphical user interface (GUI) for receiving frequency data and other information input by users 16a, 16b, and a GUI for displaying the analysis information for the various frequency data input.

Databases are provided in the data transforming system 10 in accordance with the illustrated embodiment. In particular, the data transforming system 10 shown includes a generic database 70, which includes stored frequency spectra data as well as analysis data, analysis tools, filters, and other data and files that may be used to perform actions on the frequency spectra data. Other information regarding the frequency spectra can be stored in the database 70 as well.

FIGS. 2-16 show example data sets using frequency spectra and compare the resulting compact forms of the spectra with the original stretched-out forms as the spectra are transformed using the system and method of the present invention.

Figure 17B:
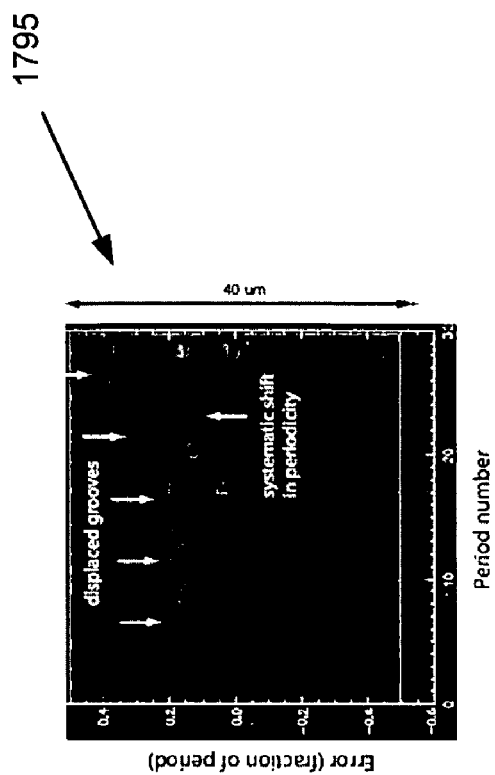
FIG. 17 shows high resolution images of an optical grating data set acquired with an scanning electron microscope and a transformed image in accordance with the present invention.
Figure 17A:
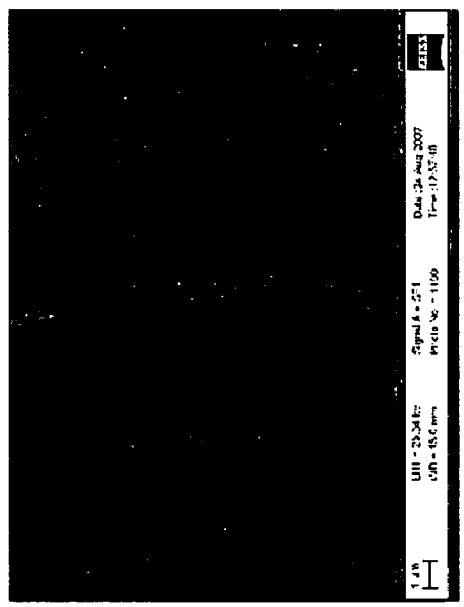

FIGS. 17A and 17B show additional analysis of an array of data values using the system and method of the present invention. The array analyzed in FIG. 17B was formed by concatenating multiple high resolution images such as that in FIG. 17A to form a new, panoramic image. The transformation of dispersed data patterns in the panoramic image into moving objects employs the method and system of the present invention to simultaneously view high resolution information and macroscopic trends. The two-dimensional transformation example utilizes microscopy images from a scanning electron microscope.

Mapping Definition

In accordance with one embodiment of the present invention, the system and method of the present invention compacts a spectrum from its serial form to increase the proximity of spectral patterns to form visual objects, and the objects are made to move to enhance recognition.

The procedure used to produce the visual display may be implemented by mapping a frequency axis multiple times onto a set of parallel vertical lines in the x-y plane, shifted in such as way that a target spectral peak sequence lies along the x-axis. The set of parametric equations shown below (Equations 1) sets the peak sequence $F_n$ along the x-axis, where n is the integer index and $F_{test}$ is a test fundamental frequency. The value of a function of frequency, F, (such as Fourier transform amplitude, phase, power spectral density, etc.) is assigned to the z-axis.

Equations 1

$$x = n \quad (1)$$
$$y = \frac{1}{F_{test}}[F - F_n]$$

Motion may be produced by varying $F_{test}$ or another parameter. The choice of non-uniform mappings in x and y, such as log-log and log-linear, further extends the method of the present invention.

A useful special case occurs when the target spectral sequence is the harmonic series, $Fn=nF_{test}$. Then, Equations 1 reduce to:

Equations 2

$$x = n \quad (2)$$
$$y = \frac{F}{F_{test}} - n$$

where n is the harmonic number and consecutive harmonics of the test fundamental, $F_{test}$, lie along the x-axis, separated by one unit each. Restriction of the harmonics to the horizontal strip, $-\frac{1}{2} \leq y < \frac{1}{2}$, avoids redundancy. The method of transforming the spectrum effectively replicates the spectrum into lines. Normalizing F to $F_{test}$ gives each line or segment a length of one.

Figure 3:
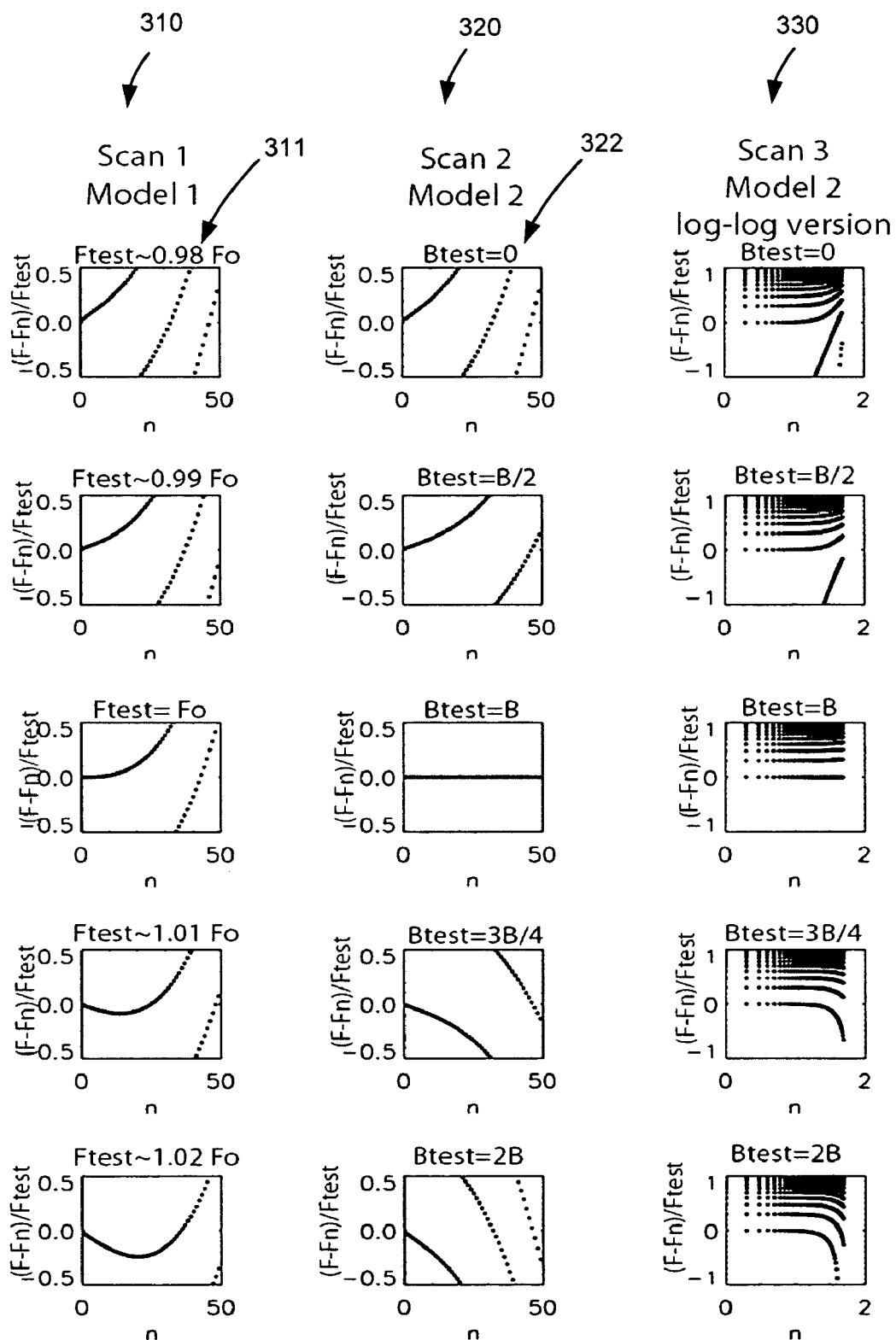
FIG. 3 illustrates scan sequences to simulate the motion of inharmonic spectral sequences in an embodiment of the present invention.

FIG. 3 illustrates the motion of an inharmonic spectral sequence, and how changing the target spectral sequence and scan parameter definitions can be used to produce different motion signatures. Each column of scans 310, 320 compare the positions where $\hat{F}=\hat{n}F_0\sqrt{1+\hat{n}^2B}$ for two different target spectral sequence models. In scan 310, test model 311 is the series that would appear along the x-axis and is $F=nF_{test}$ and $F_{test}$ is scanned through $F_0$. In scan 320, test model 322 is given by Equation 3 below, where $F_{test}=nF_0$ is fixed, and $B_{test}$ is scanned. Scan 330 is a log-log version of scan 320.

FIG. 3 illustrates the motion of an inharmonic spectral sequence, and how changing the target spectral sequence and scan parameter definitions can be used to produce different motion signatures. Each column of scans 310, 320 compare the positions where $\hat{F}=\hat{n}F_0\sqrt{1+\hat{n}^2B}$ for two different target spectral sequence models. In scan 310, test model 311 is the series that would appear along the x-axis and is $F=nF_{test}$ and $F_{test}$ is scanned through $F_0$. In scan 320, test model 322 is given by Equation 5 below, where $F_{test}=nF_0$ is fixed, and $B_{test}$ is scanned. Scan 330 is a log-log version of scan 320.

Figure 4:
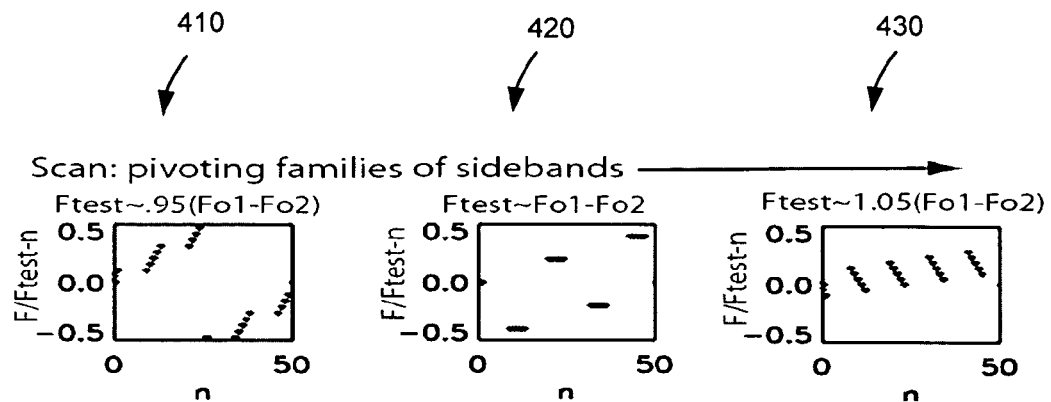
FIG. 4 illustrates scan sequences to simulate the motion of sidebands in spectral sequences in an embodiment of the present invention.
Figure 5:
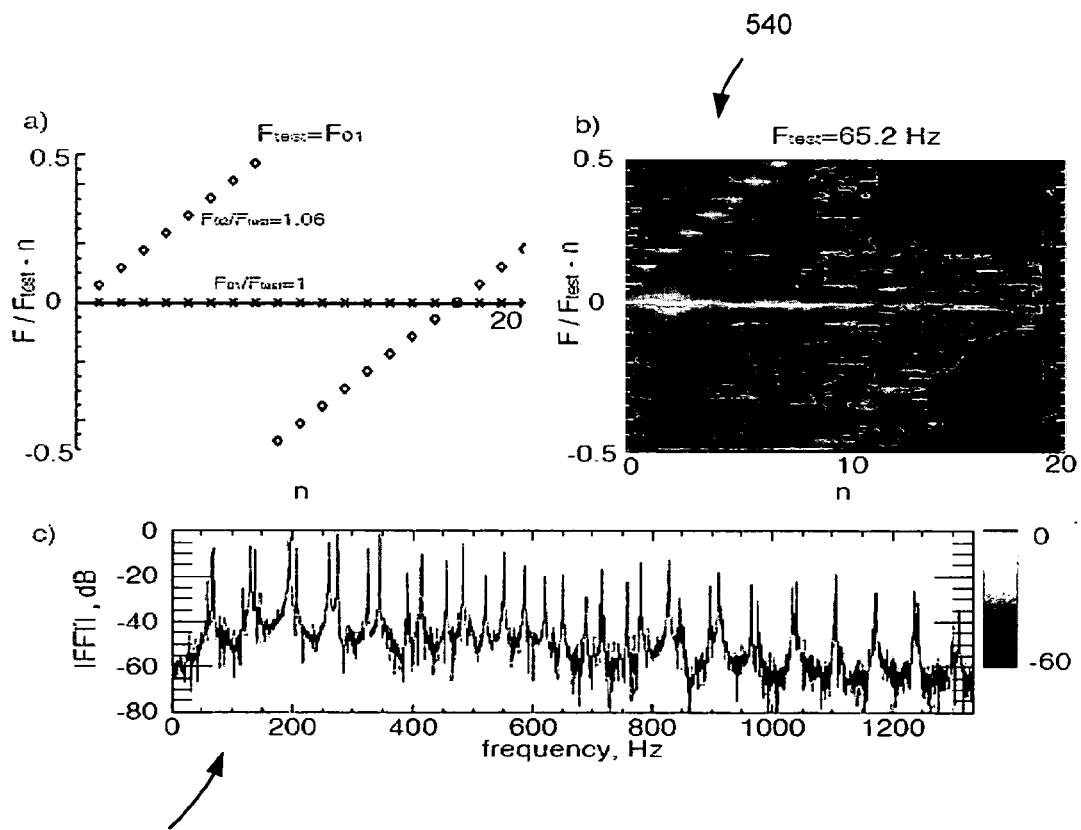
FIGS. 5A-5C illustrate the identification of two harmonic series in a spectrum in accordance with an embodiment of the present invention.

As briefly described above, FIG. 4 illustrates the motion of sidebands. The positions of a few sidebands 410, 420, 430 around harmonics of $F_{01}$ are shown. Scans show snapshots as $F_{test}$ is scanned through $F_{01}$, using Equations 2. In this case, each family of sidebands 410, 420, 430 pivots about its center, that is one of the harmonics of $F_{01}$. Scanning $F_{test}$ through $2F_{01}$ separates the families of sidebands 410, 420, 430 around the odd and even harmonics of $F_{01}$. Another signature is produced when $F_{test}$ is set to the separation between sidebands. When $F_{test}$ is set to the separation between sidebands, $F_{01}$ and $F_{02}$, each family of sidebands 410, 420, 430, pivots about its center as shown in FIG. 4. Other useful values of $F_{test}$ for sum and difference frequencies generated by Fo1 and Fo2 include $F_{test}=(Fo1+Fo2)/2$, or either fundamental. Then, the motion signatures resemble those of FIG. 2, except that a grid of sidebands pivots along with the line of harmonics.

Relationship with Residual Plotting

Figure 2:
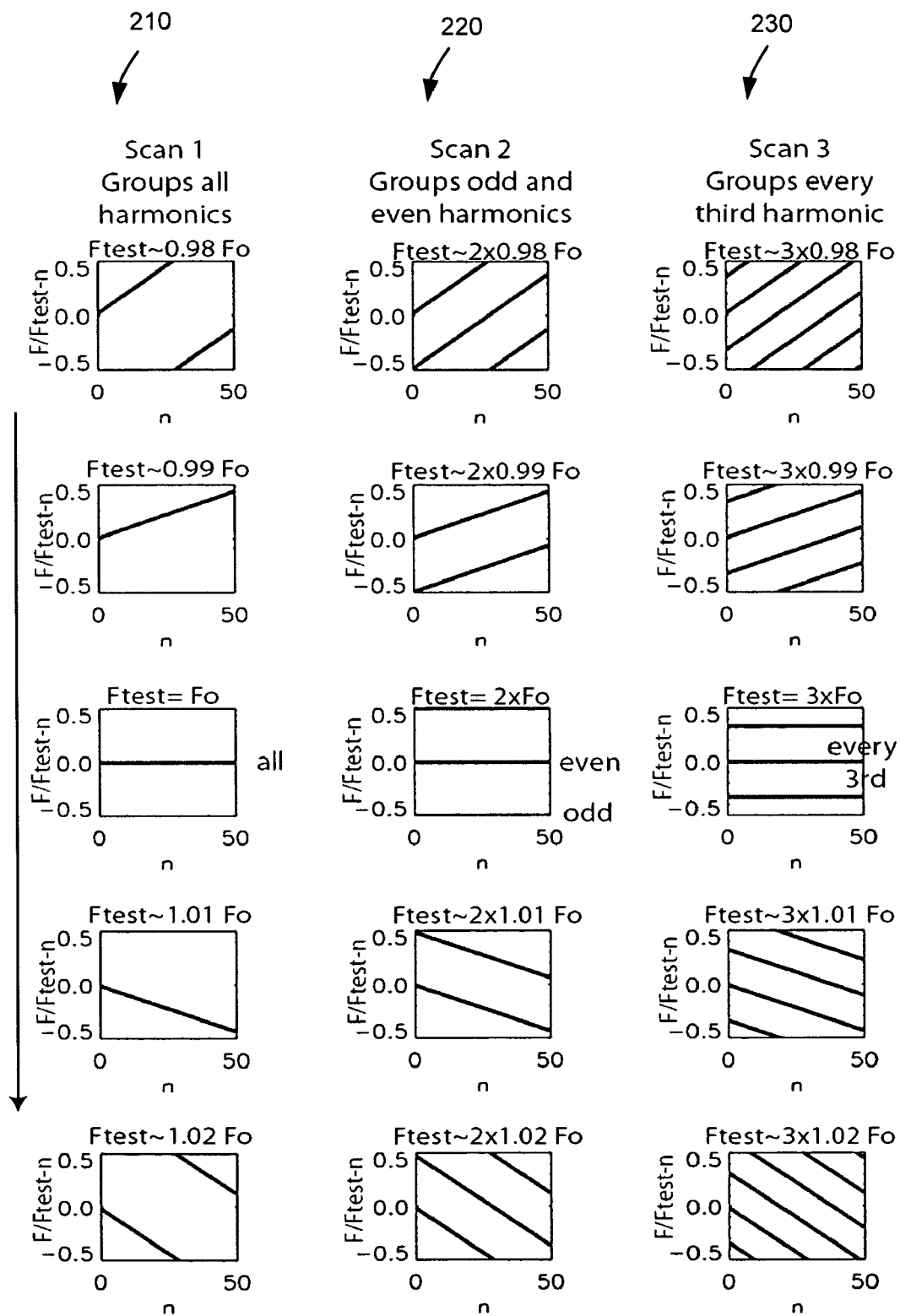
FIG. 2 illustrates scan sequences to simulate movement of reference objects formed by harmonics of a fundamental frequency in accordance with an embodiment of the present invention.

Equations 1 take a frequency spectrum, another function of frequency, or more generally, any serial data set and map it so that the peaks in the data automatically appear in the positions of a residual plot with respect to the target spectral sequence that is defined for the x-axis intercepts. Residual plots provide excellent results when comparing the magnitude of deviations between a measurement set and model prediction because the eye's bias when judging the magnitude of deviations is different when the reference is a straight line than when it is a curve. In addition to the advantage of bypassing the process of calculating residuals, Equations 1 go beyond standard residual plotting techniques in several ways. A third dimension of information (the peak height) is included through the color map. Furthermore, Equations 1 can produce more than one meaningful reference curve, as can be seen in FIGS. 2, 3, and 4. The additional reference curves in FIGS. 2, 3, and 4 often appear along linear features in the x-y plane in useful cases, which facilitates the visual interpretation of systematic deviations.

Generation of Companion Maps with Complementary Features

In accordance with the present invention, a number of alternatives to Equation 1 and 2 can be defined, including concentric circles or spirals. More companion maps can be produced by taking (x,y) in Equation 1 or 2 to be in the complex plane and applying conformal mapping techniques. The circular or spiral maps have the advantage that patterns of harmonics join at the origin, making their presence easier to detect because of the increased visual continuity. However, Equations 1 and 2 offer the advantage over other maps of similarities with the standard technique of residual plotting in special cases, as described above. Since the multiple reference curves in FIGS. 2, 3, and 4 often appear along linear features in the x-y plane, their corresponding reference curves in a new set of roadmaps obtained via conformal transformations are found by following how a line transforms in each map.

A harmonic series is a rudimentary example that illustrates the basic principle of the mappings. Data containing two harmonic series is analyzed as an illustration before analyzing more complicated data sets.

Visual identification of two different harmonic series in data occurs through the spatial regrouping of the positions of harmonics of different fundamentals. When a spectrum containing energy at harmonics of an unknown fundamental, $F_0$, is analyzed by scanning $F_{test}$ in Equation 2, consecutive harmonics lie along lines with a slope that depends on the difference of $F_0$ and $F_{test}$. When $F_{test}$ is scanned through $F_0$, the row of harmonic positions appears to pivot about the origin, sweeping through the x-axis when $F_{test}=F_0$. A priori knowledge of the exact value of a fundamental frequency in the data is not required.

An example of the separation and identification of two harmonic series with different fundamentals is shown in FIG. 5A. The spectrum 530 of a minor second (pitches A and $B^b$ for which the fundamentals $F_0$ are 65.2 Hz and 69.0 Hz, respectively) played simultaneously with a 16 foot organ pedal flute stop is shown in FIG. 5C. The two second duration signal was recorded with a sampling frequency, $F_s$, of 44.1 kHz and 16 bit resolution. The transformed data for $F_{test}=65.2$ Hz is shown in FIG. 5B, where the harmonics of 65.2 Hz group together along the x-axis and those related to 69.0 Hz lie along the oblique line 540, which wraps around the selected strip of the x-y plane near the $8^{th}$ harmonic.

Identification of Basic Effects Using a Challenge Spectrum

The challenge spectrum chosen as the main test data set is that of an octave played on a piano. This particular spectrum was chosen for analysis because it challenges many pitch identification algorithms, which often suffer from octave ambiguity problems. The upper note of the octave adds energy to the even harmonics for low partial numbers. Known effects in piano spectra include inharmonicity, phantom partials, and coupled string effects.

Figure 6:
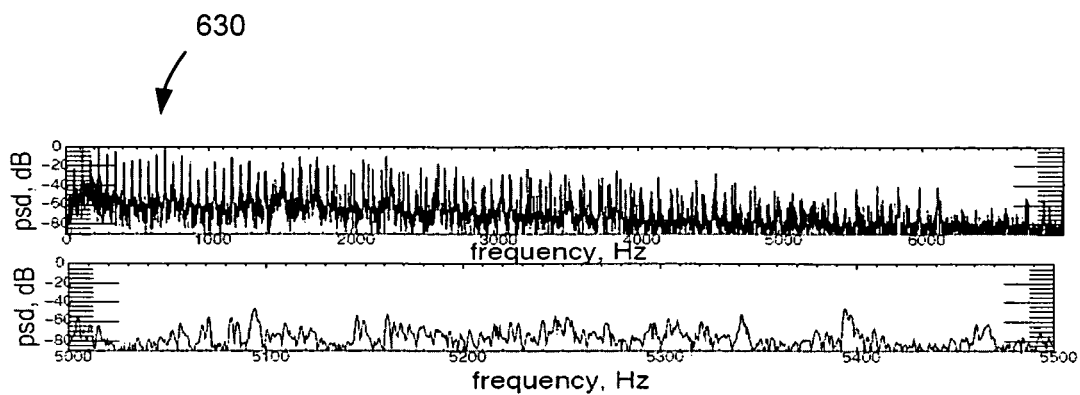
FIG. 6 illustrates a challenge spectrum power spectral density as a function of frequency as an x-y plot in accordance with the present invention.
Figure 7:
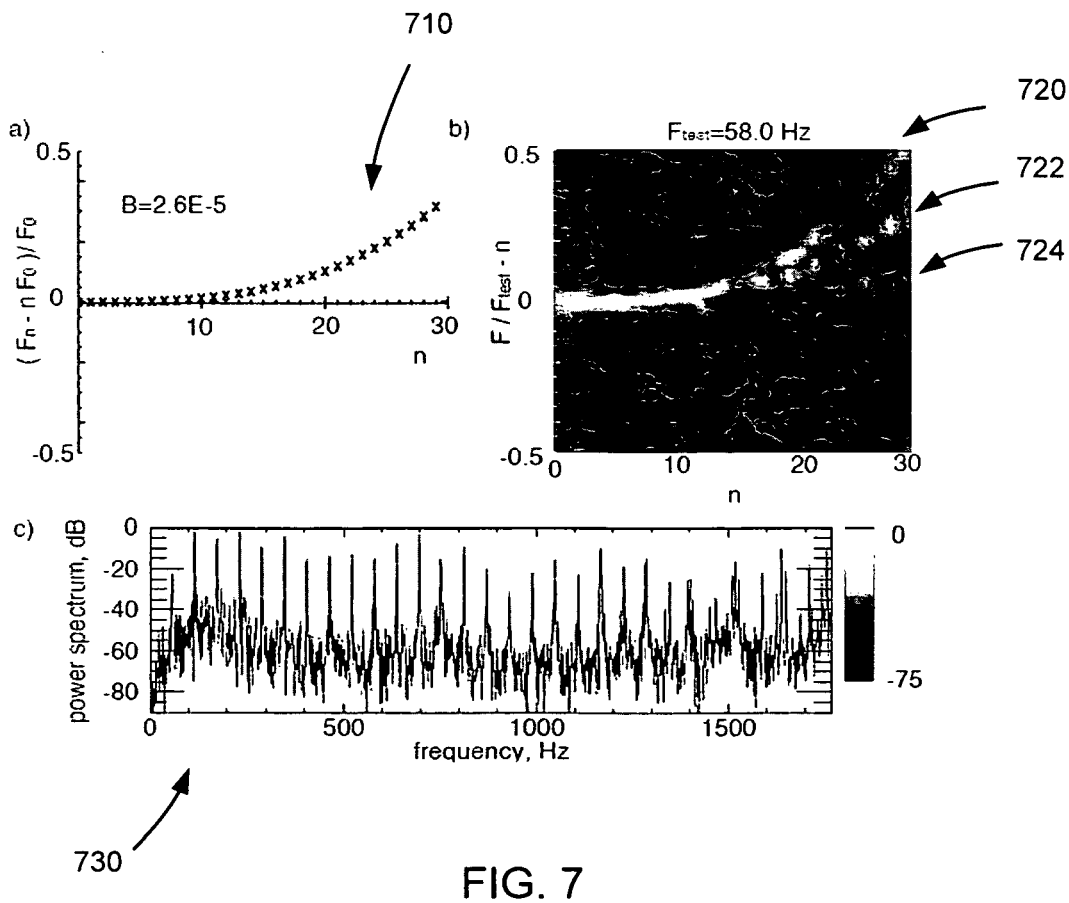
FIGS. 7A-7C illustrate a residual plot, a transformed power spectrum, and a power spectrum, respectively, of a $B^b$ octave in accordance with the present invention.
Figure 8:
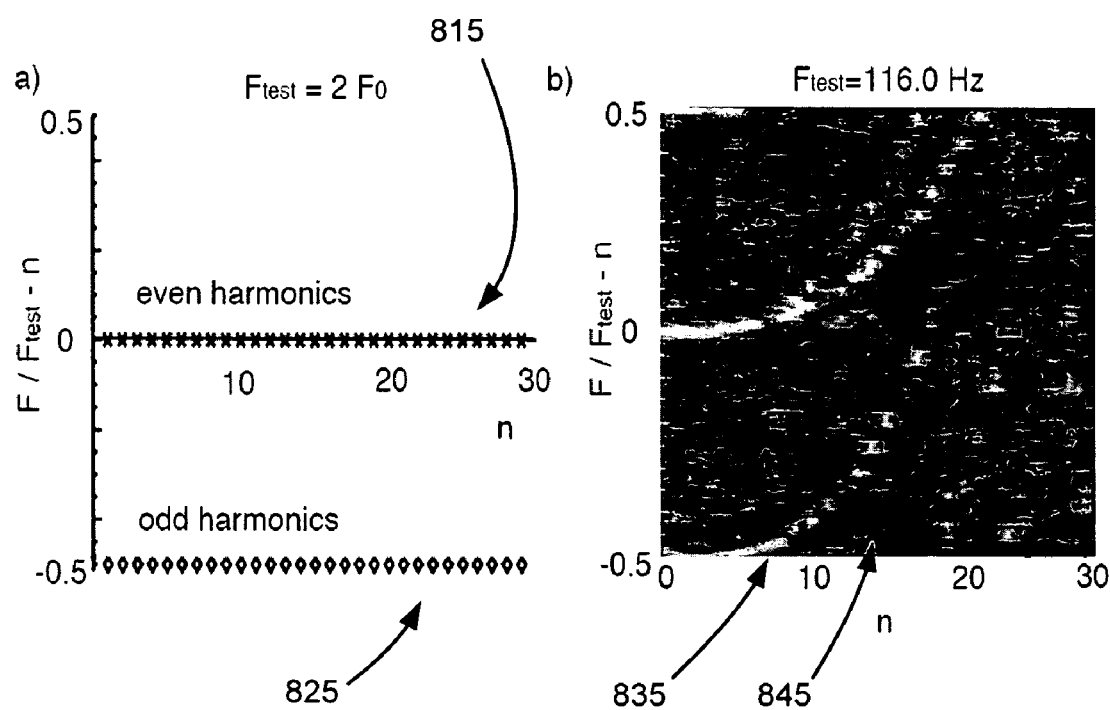
FIG. 8A depicts a comparison of odd and even harmonics in accordance with the present invention.
FIG. 8B graphically illustrates the characteristics of the odd and even harmonics in accordance with the present invention.

The spectrum 630 shown in FIG. 6 was obtained from a $B^b$ octave, that is, a lower $B^b$ of $F_{01}=58.0$ Hz and an upper $B^b$ of $F_{02}=2\times58.0$ Hz. The $B^b$ octave was played fortissimo on a grand piano with full pedal. The spectrum 630 was recorded at 96 kSa with 24 bit resolution. A Blackman window weighting was applied to the 1.5 second long signal to reduce leakage within the Fourier Transform analysis.

Following a brief discussion of the advantages and disadvantages of the mapping in comparison with a family of related maps, the transformed versions of the spectrum 630 shown in FIG. 6 are juxtaposed with the traditional x-y plot form in the following sections.

Analysis of the inharmonicity of piano tones illustrates a number of features of the mapping technique in accordance with the present invention. Equation 3 below models overtones, $F_n$, associated with a piano string.

$$F_n = nF_0\sqrt{1+n^2B} \quad (3)$$

Equation 3

In Equation 3, B is the inharmonicity coefficient. The inharmonicity coefficient depends on string-related parameters, and thus varies across a piano. When the harmonic series is used as the model, inharmonicity appears in a residual plot 710 as a systematic deviation from the horizontal reference axis for large integers n as shown in FIG. 7A. When the FFT amplitude or power spectrum 730 is transformed for the case $F_{test}=F_0$ deviations from the harmonic series positions automatically appear as in the residual plot 710. Note that no peak fitting has been performed and no assumptions about the correspondence of peaks with a particular value of n were required to create the plot.

The transformed data 720 shown in FIG. 7B for $F_{test}=58.0$ Hz reveal the signature of several distinct inharmonic spectral tails 722, 724. Because the inharmonicity parameter, B, varies across the keyboard, the value of B for the lower $B^b$ is different than the value for the upper one. Since the lower $B^b$ contributes to both the odd and even overtones while the upper $B^b$ adds energy to the even overtones, the ability of the system and method of the present invention to show the distribution of the tails between odd and even spectral peaks is very valuable.

When the test fundamental is twice the fundamental of a harmonic series in the data, the odd harmonics 825 and even harmonics 815 separate in space, grouping along the horizontal lines at y=0 and y=-½, respectively, as shown in FIG. 8A. This enables further examination of the imbalance in the distribution of odd and even harmonics and is useful in resolving octave ambiguity.

Continuing the analysis of the spectrum shown in FIG. 7C, the transformed data of the power spectrum 730 corresponding to $F_{test}=2F_0$ is shown in FIG. 8B, confirming that two of the inharmonic tails 835, 845 appear only in the odd harmonics.

Separation of Every $m^{th}$ Harmonic

When the test fundamental frequency, $F_{test}$, is exactly an integer multiple, m, of $F_0$, every $m^{th}$ harmonic lies on one of m equally spaced horizontal lines in the horizontal strip, with each consecutive integer x-position filled with a harmonic. Rational $F_{test}/F_0$, produce a similar signature, but have gaps between harmonic positions in x. When viewed in animated form, these signatures appear in a characteristic temporal sequence, creating a visual rhythm as objects appear and disappear in the display, which greatly helps to visualize and identify the presence of a particular harmonic series.

Motion for Feature Identification

Once the frequency spectrum is compacted as described above, the system and method of the present invention employs motion to improve visualization of the frequency spectrum and the frequency effects. Overlap due to wrapping effects in the right half of contour plots make the tails of the even harmonics difficult to differentiate. Scanning $F_{test}$ introduces motion into the analysis. The frame sequence 910, 920, 930, 940, 950, 960 in FIGS. 9A-9F run from $F_{test}=116.3$ Hz to 119.1 Hz and have been extracted from a longer $F_{test}$ animation. Motion facilitates the identification of features of the spectrum.

Figure 9A:
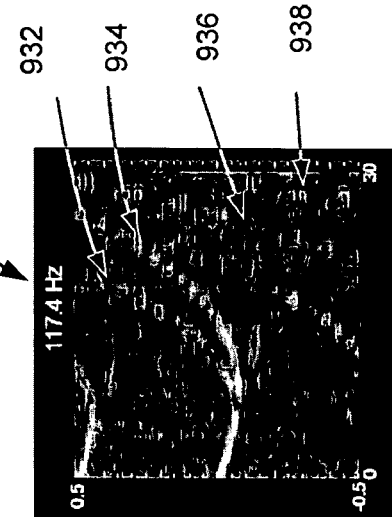
FIGS. 9A-9F illustrate the identification of inharmonic tails by tracking even harmonics across frames of a scan in accordance with the present invention.
Figure 9B:
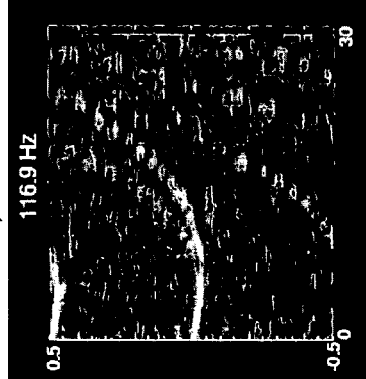
Figure 9C:
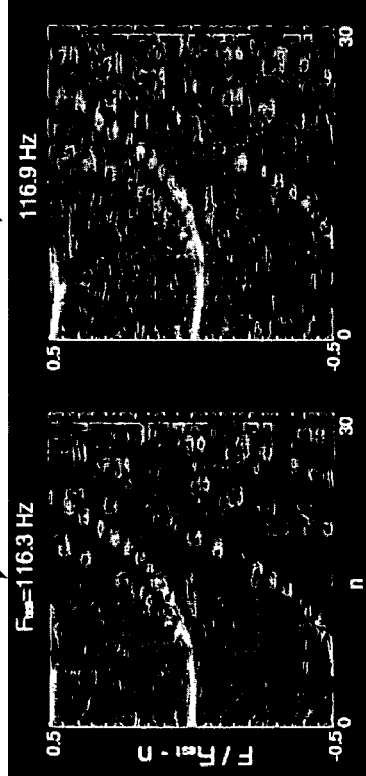
Figure 9D:
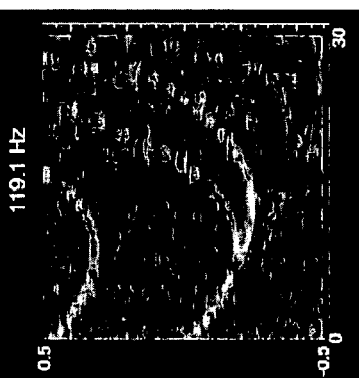
Figure 9E:
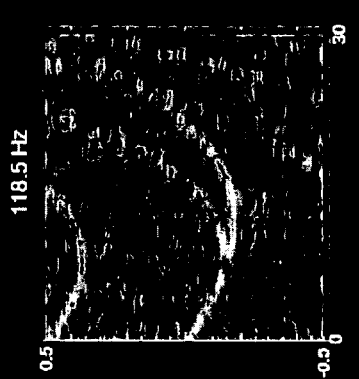
Figure 9F:
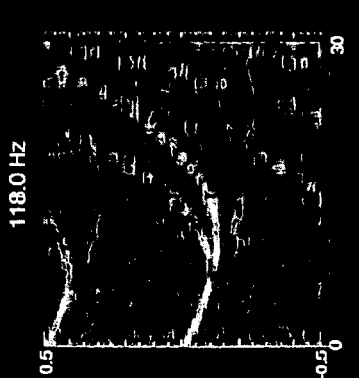

The frame sequence 910, 920, 930, 940, 950, 960 suggests that there might be four tails 932, 934, 936, 938 rather than three tails associated with the even harmonics 431 (best shown in FIG. 9C). Tracking the even harmonics across the frame sequence 910, 920, 930, 940, 950, 960 of an $F_{test}$ scan assists in the visualization of four inharmonic tails. Odd harmonics 941 have wrapped around and re-emerged from the top of the horizontal strip (best shown in FIG. 9D). When viewed in animated form, the tails 932, 934, 936, 938 change curvature at different rates, and this relative motion in the right half of each image of the frame sequence 910, 920, 930, 940, 950, 960 helps to visualize this effect. The animated frame sequence untangles four rather than three tails associated with the even harmonics for the spectrum of the octave. The effects may be quantified using pitch identification techniques. Of course, other quantitative measures may also be employed. When applied in tandem with comb filtering or other pitch identification techniques, the technique and method of the present invention may be used to interpret the output of the pitch identification techniques. These techniques are described in further detail in the sections below.

Inharmonic Model for Target Spectral Pattern

Figure 10:
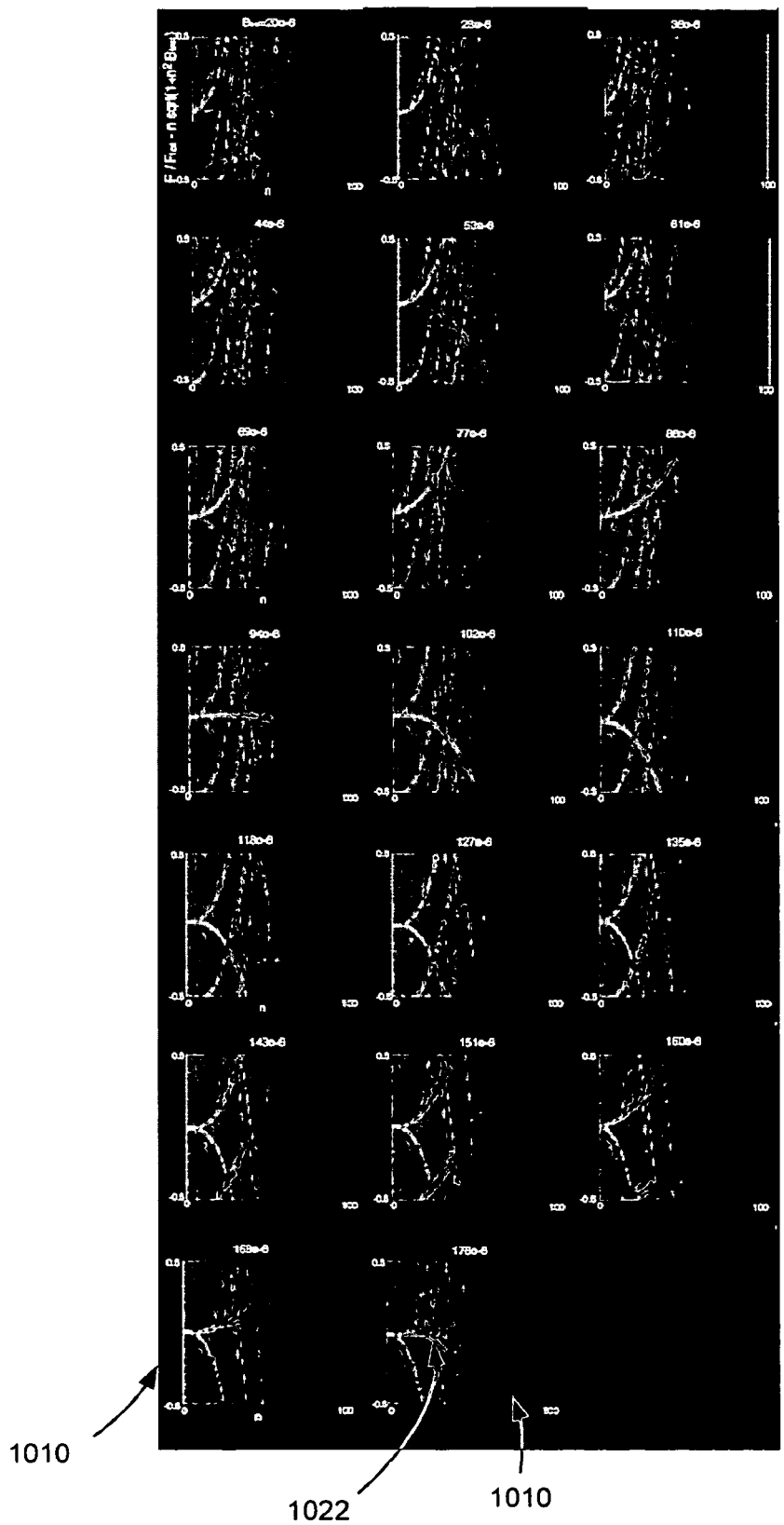
FIG. 10 shows plots of an inharmonic target spectral sequence using scanning methods of the present invention to produce motion.

To reset the target spectral sequence to an inharmonic model, the model given by Equation 3 is used for $F_n$ in Equation 1 with the inharmonicity parameter, B, replaced with a variable test parameter, $B_{test}$. Motion is introduced by scanning $B_{test}$ and is shown in FIG. 10 for $F_{test}=2F_0$. Comparison of the behavior at y=0 and y=½ confirms that two of the tails are only associated with the even harmonics. At large n, six prominent branches, with indications of sub-groupings, become visible in the final frames of FIG. 10. For small n, the last frames 1010, 1020 of FIG. 10 show agreement with the target model, Equation 3, but the cluster 1022 shows a general, systematic deviation from the model along the x-axis for large n. The motion-based features of the technique provide a tool for displaying the detail of the global trends over larger ranges of n than before, reaching the portions of the spectrum where the x-y plot becomes hard to interpret directly. This effect may be visualized by comparing FIG. 10 with FIGS. 6 and 9.

Provided that $F_{test}$ is set to the fundamental frequency of the pitch, when the model accurately represents the data, $B_{test}$ is scanned through the actual value of B and the partials related to this particular tail appear along the x-axis. In this special case, deviations can be interpreted as residuals. However, when $F_{test}$ is not equal to the fundamental frequency of the pitch, deviations are verified for each choice of target spectral sequence model, in addition to partial residual plots.

For example, when $F_{test}=2F_0$ as in FIG. 10, because this is the spectrum of an octave, $F_{test}$ is set to the fundamental frequency of the upper $B^b$ but is off from the fundamental frequency of the lower $B^b$ by a factor of 2. Equation 3 with n replaced by n/2 shows that in order for a tail associated with the lower $B^b$ to appear along the x-axis, $B_{test}=4B$. In FIG. 10, deviations may also be present if the piano is out of tune.

Synergistic Use with Quantitative Techniques

Synergistic pairings can be made between the visualization technique and quantitative numerical techniques, such as the cepstrum, autocorrelation, Short Time Fourier Transform, comb filtering techniques and the like. When a comb filter is used for pitch identification, output is produced whenever the comb filter passbands coincide with spectral peaks. Generally, the global maximum of the comb filter output is the fundamental frequency. Comb filters produce subsidiary, local maxima when the passbands coincide with every $m^{th}$ harmonic. Paired with the visualization system and method of the present invention, both the subset of spectral peaks that act to produce the subsidiary, local maxima and the subset that does not contribute can be tracked at the same time, providing a different point of view of the comb filter output.

When used in tandem with existing inharmonic comb filtering techniques, the scan shown in FIG. 10 may be used to determine the origin of local maxima in the inharmonic comb filter output when the inharmonicity parameter is scanned, and may be useful in optimizing the inharmonic model chosen for a given piano.

Sidebands

Figure 11:
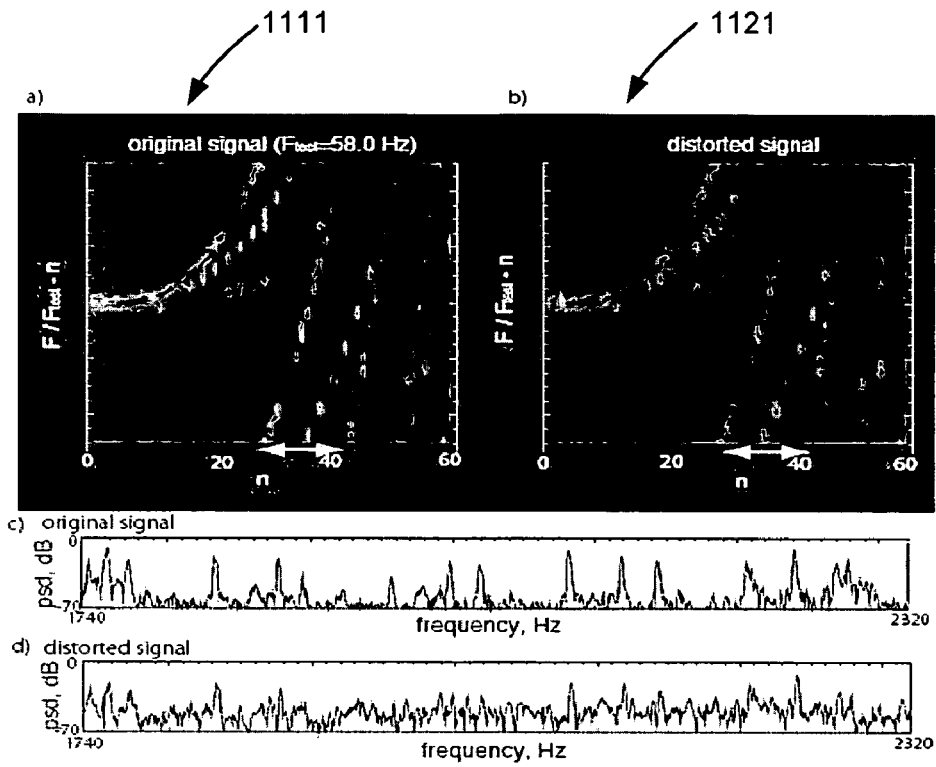
FIG. 11 shows a comparison of an octave before and after distortion and the corresponding spectra using a method of the present invention.
Figure 12:
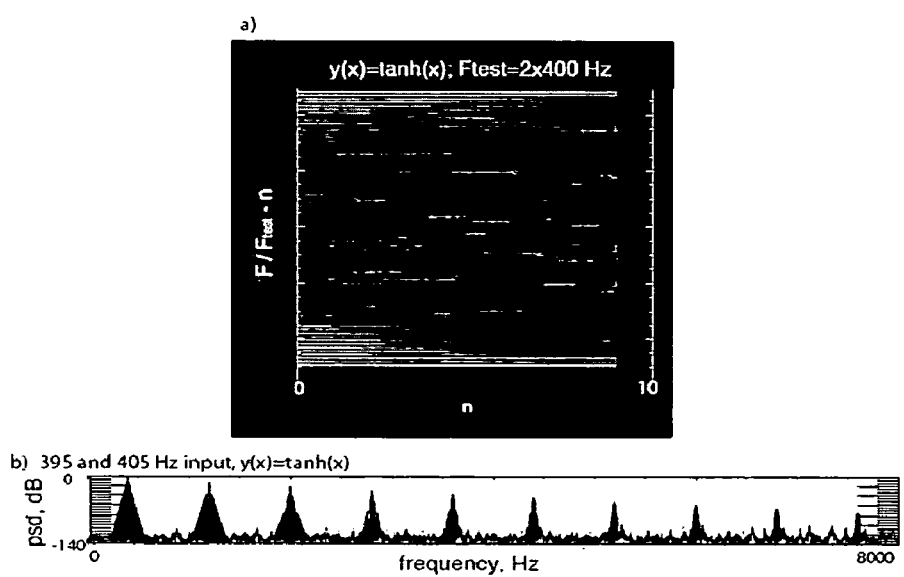
FIG. 12 shows data with sidebands generated using an odd nonlinear function in accordance with the present invention.

Two examples involving sidebands are shown in FIGS. 11 and 12. When the audio signal 1111 corresponding to FIG. 6 was passed through an over-driven loudspeaker, the distortion-related peaks 1121 appeared as shown in FIG. 11. The data in FIG. 12 was synthetically generated using a nonlinear function, y(x), and an input, x(t) consisting of two tones:

$$x(t)=A\cos(2\pi F_1 t)+A\cos(2\pi F_2 t)$$

$$y(x)=\tan h(x) \quad (4)$$

Equations 4 with A=2, $F_1$=395 Hz, and $F_2$=405 Hz and is plotted so that the even harmonics of 400 Hz would lie along the x-axis, and the odd harmonics and associated sidebands group around y=−½ and y=½.

Example

Visual Pitch Identification in Polyphonic Music

Figure 13A:
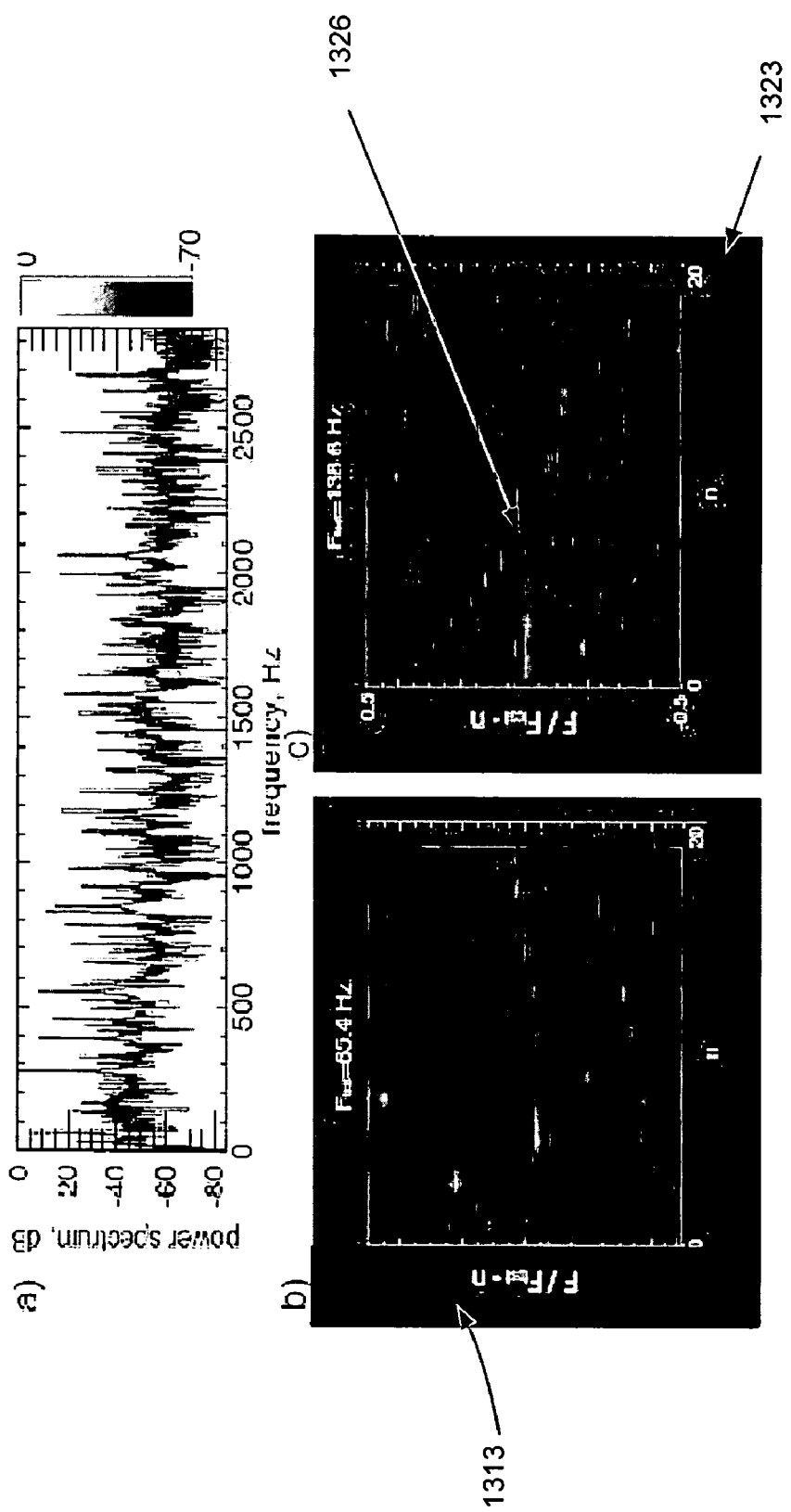
FIG. 13A illustrates a spectrum and analysis using visual polyphonic pitch identification in accordance with the present invention.
Figure 13B:
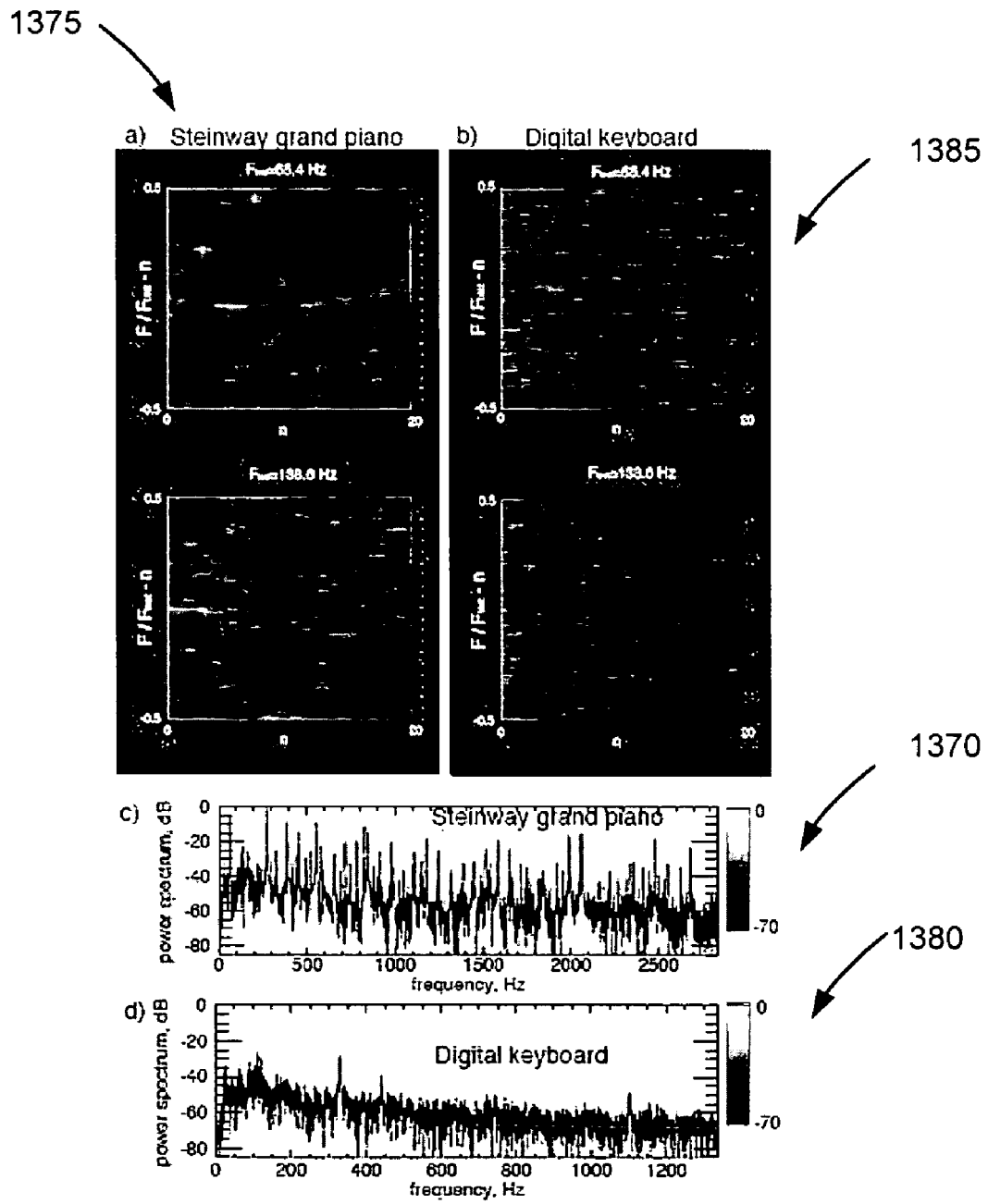
FIG. 13B illustrates a spectrum produced by a concert grand piano and a corresponding analysis in accordance with the present invention and compares it to a spectrum produced by a digital keyboard and its corresponding analysis.

When the spectrum of an excerpt of polyphonic music is displayed, the partials (overtones) related to each pitch appear in non-consecutive order in the spectrum, making relationships between partials difficult to judge, especially for high partial numbers. The spectrum of the overtone cluster produced in the aftersound at the end of the first phrase of the Copland Piano Variations (1932) is analyzed here as the example. The signal, acquired from a Steinway concert grand, was of one second duration and was sampled at 44.1 kHz. Note the difficulty of visually extracting the patterns directly from the spectrum in serial form, shown in FIG. 13. In FIG. 13, snapshots 1313, 1323 extracted from a dynamic scan exhibit organized energy along the x-axis when $F_{test}$=65.4 Hz and $F_{test}$=138.6 Hz, indicating energy at the harmonics of both fundamentals. In snapshot 1323, the odd and even partials related to the lower pitch also appear in diagonal 1326. One application of the system and method of the present invention is in the development of synthetic musical instruments, such as digital keyboards, in which it may be useful to compare side-by-side visualizations analyzing the sound produced by a synthetic instrument with corresponding visualization for the sound produced by the real instrument. Another application is in the improvement or replication of musical instruments or in comparing the quality of different musical instruments of the same type. In FIG. 13B, an example of a spectrum produced by a concert grand piano 1370 is analyzed for two values of $F_{test}$ and shows the presence of overtones with fundamentals near 65.4 Hz and 138.6 Hz. The same spectrum 1380 and analysis 1385 is shown for a digital keyboard. The analyses allow details of the discrepancies in sound to be compared.

As shown in FIGS. 2-13, complex spectra can be explored effectively with the system and method of the present invention to compare details of the discrepancies in sound.

The system and method of the present invention identifies harmonics and other frequency spectra effects by spatially compacting the spectrum and uses motion of the resulting waveforms to facilitate identification and characterization of related sets of peaks in the plots. The above examples from audio spectra of musical instruments illustrate the signatures of multiple harmonic series, systematic deviation from the harmonic series, and differences between odd and even harmonics. Additionally, complex spectra may be transformed from a visually indigestible serial form to a form that reveals information about the harmonic content. Different functions of frequency were utilized in the examples, including Fourier transform amplitude, power spectrum, and the like. Other options include comparison of the phases of different harmonics or periodic modulations in the envelope of spectral peaks. Other applications include treating frequency, F, in Equation 1 as a dummy variable to extend the methods of the present invention to data dependent on space, time, and other variables. The system and method of the present invention may be used in examining and analyzing spectra data and in generating hypotheses and conclusions regarding the spectra both alone, and in tandem with quantitative techniques.

Tracking Harmonics and Artifacts in Spectra Using Sinusoidal and Spiral Maps

For example, in accordance with one embodiment of the present invention, a method is directed to developing expressions for the positions of the objects in the case where the moving objects are formed from periodic peaks in the data. Mapping the data onto a sinusoidal curve centers the periodic peaks in the data at the same positions as a sampled sinusoid. By defining transformations that map the sinusoidal curve onto other curves, the behavior of a sampled sinusoid can then be used to predict the positions and movement of the periodic peaks in the new map. Examples of a few simple curves include lines, concentric circles, spirals, helices, and the like. An example of a mapping of the sinusoid onto lines consists of the lines defined by Equation 1 in the horizontal strip between y=−½ to y=½, where each line segment corresponds to one period of the sinusoid. Alternatively, Equation 2 may also be used as well. A similar example of a mapping onto concentric circles maps each period of the sinusoid onto one of the concentric circles. A similar example of a mapping onto a spiral sets one turn of the spiral to one period of the sinusoid. This example of a mapping onto a spiral sets is illustrated in detail below to demonstrate the system and method of the present invention by which the combination of maps can be used to derive properties of the new map. The combination of maps can be used to develop an interpretation of new curves that cut across the original curves. The latter plays a role in both perceptual (characteristic of the human visual process) and non-perceptual (numerical) aspects of the methods.

As an example, a spatial separation of a specific musical pitch from an artifact is demonstrated below to highlight features of the system and method of the present invention.

Synopsis of Approach

To demonstrate the efficacy of the system and method of the present invention, the below example utilizes a pair of spectral maps. The method of the present invention starts with the systematic set of patterns that appear when a sinusoid is sampled near the Nyquist rate. A mapping that concentrates these patterns is chosen. The sinusoid is transformed to a spiral. A linear, rather than a logarithmic map of the spectrum is used, and the spiral is defined in the complex plane. A procedure for mapping a spectrum onto a sinusoidal curve is defined. The positions of harmonics in this map match with those of samples of the sinusoid. The relationship between the two maps and a sampled sinusoid facilitates the derivation of properties. The utility of curves that cut across the underlying sinusoid and spiral for the application of harmonic tracking is then shown. Further, the linear map of frequency offers advantages for the application of harmonic tracking and is demonstrated with a practical example using an audio spectrum.

Mapping Definitions and Properties

Revisiting the Patterns Formed by Sinusoid Samples Near the Nyquist Rate

When a sinusoid is sampled close to the Nyquist rate, patterns appear that compete for attention with the underlying sinusoid. This effect is an example of a phenomenon often referred to as "visual dissonance." Sampling just above the Nyquist rate produces these perceptual effects in plots, despite a sampling rate sufficiently high to unambiguously determine the frequency of the underlying sinusoid. When viewing a sinusoid sampled near the Nyquist rate, the eye tends to track patterns according to spatial proximity. The first column 1401 of FIG. 14 displays the systematic evolution of these patterns 1410a, 1410b, 1420a, 1420b, 1420c as the sampling is scanned from below the Nyquist rate to above the Nyquist rate. Groups of sinusoid samples 1415, 1425, 1435, 1445, 1455 match directly with spiral features 1416, 1426, 1436, 1446, 1456. When the frequency axis is mapped along the underlying curves, spectral harmonics center about the former positions of the samples, so that the patterns 1410a, 1410b, 1420a, 1420b, 1420c shown in FIG. 14 can be linked with either groups of samples or groups of related harmonics. The unsampled sinusoid is given by Equation 5 below:

$$s(u) = \cos\frac{2\pi}{a}u; \tag{5}$$

and the sampled sinusoid is given by Equation 6 below:

$$s(n) = \cos 2\pi \frac{T_s}{a} n, \tag{6}$$

where Ts=1/Fs is the sampling period.

Concentrating the Patterns

Principles of Gestalt psychology indicate that the perception of these visual effects can be altered by increasing the spatial proximity of points belonging to one of the patterns while dispersing the points belonging to another pattern. This can be accomplished using the system and method of the present invention by transforming the sinusoid into a different curve characterized by periodicity in space. The concentrating/dispersing effect obtained by transforming the sinusoid onto an Archimedean spiral is shown in the second column 1402 of FIG. 14, where the mapping is given by Equation 7:

$$\theta = \frac{2\pi}{a}u \tag{7}$$

$$\text{sinusoid}: s(\theta) = \cos\theta \tag{8}$$

$$\text{spiral}: z = rL\theta = re^{j\theta} = a\theta e^{j\theta} \tag{9}$$

The spiral has been defined in the complex plane with polar coordinates (r, θ). The period, a, of the sinusoid determines the constant of proportionality of the spiral. Both underlying curves given by Equations 7 and 9 become visually distinguishable when the sinusoid is sufficiently oversampled. The regime for examination for this instance is close to the Nyquist rate for the sinusoid.

Spectral Maps

Spectral Map Definitions

To map a spectrum along either of these curves, the curves are parameterized in frequency using Equation 10.

$$\theta = 2\pi F/F_{test} \tag{10}$$

As such, the parameterized sinusoid and spiral become Equation 11 and Equation 12, respectively:

$$\text{sinusoid}: s(F) = \cos 2\pi \frac{F}{F_{test}} \tag{11}$$

$$\text{spiral}: r(F)L\theta(F) = 2\pi a \frac{F}{F_{test}} e^{j2\pi \frac{F}{F_{test}}} \tag{12}$$

Spectral intensity and other functions of frequency occupy a third dimension, such as a color map coordinate or height above the curve.

Positions of Harmonics

When a pure harmonic series with fundamental frequency, $F_o$, resides in the spectrum, the positions of the harmonics, $F_n = nF_o$, along the sinusoidal map ideally center about the same positions as the sinusoid samples. The positions of the harmonics, $F_n$, in both maps can be found from Equation 13 and Equation 14.

$$\text{sinusoid}: s(n) = \cos 2\pi \frac{F_o}{F_{test}} n \quad (13)$$

$$\text{spiral}: r(n) \angle \theta(n) = 2\pi a \frac{F_o}{F_{test}} n e^{j2\pi \frac{F_o}{F_{test}} n} \quad (14)$$

Equations 6 and 13 are in the form of Equation 15, such that:

$$s(n) = \cos 2\pi f n \quad (15)$$

where f is a normalized frequency. Comparing the two equations (Equations 6 and 13) yields the following relationship between the sampling parameters and the harmonic tracking parameters, $$f = \frac{T_s}{a} = \frac{F_o}{F_{test}} \quad (16)$$

Special Cases

Special case 1. When $F_{test}=F_0$, the harmonics of $F_0$ appear at the positive crests of the sinusoid and at the intersections of the spiral with the positive real axis in the complex plane.

Special case 2. When $F_{test}=mF_o$, where m is a positive integer, the harmonics of $F_o$ appear along straight radial arms in the complex plane which run along the same angles as those of the $m^{th}$ roots of $e^{j2\pi n}$. In the sinusoidal map, this angle corresponds to a phase shift. Every $m^{th}$ harmonic appears along the intersection of one of m horizontal lines with the underlying sinusoid.

Aliasing

Sinusoid Sampled Below Nyquist Rate

The Nyquist rate is just satisfied when the sampling period, $T_s=a/2$, or, equivalently, $F_{test}=2F_0$, so that there are two samples per sinusoid cycle. Continuing special case 1 from above, if $F_{test}$ is below $F_o$, the sinusoid falls into the range where aliasing will occur. More precisely, if $F_{test}=F_o(1-\alpha)$, where $|\alpha\angle$, the alias frequency can be calculated by returning the normalized frequency, $f=F_o/F_{test}$, to the range $-\frac{1}{2}<f<\frac{1}{2}$:

$$s(n) = \cos 2\pi\left(\frac{F_o}{F_{test}} - 1\right)n \quad (17)$$

$$= \cos 2\pi\left(\frac{1}{1-\alpha} - 1\right)n \quad (18)$$

$$\cong \cos 2\pi \alpha n \quad (19)$$

The alias, $s(n)=\cos 2\pi u/\hat{a}$ can then be found from Equations 16 and 19, and the alias period is approximately $\hat{a}=a/\alpha$.

The period, a, of the underlying sinusoid fixes the constant of proportionality, a, of the underlying spiral curve. The alias period, â, also defines a spiral curve 1516 in the complex plane at $r\angle\theta=\hat{a}\theta e^{j\theta}$ as shown in FIG. 15A. Just as the harmonics lie at the intersection of the underlying sinusoid and the alias sinusoid in the sinusoidal map, the harmonics lie at the intersection of these two, different spirals in the spiral map. In the upper row 1510 of FIG. 15A, harmonics (shown with triangles $H_{41}$, $H_{42}$, and the like) appear at the intersection of the underlying sinusoid $S_U$ and an alias sinusoid $S_A$ with periods a and â as shown. The corresponding intersections of two spirals with constants of proportionality a and â can be seen in spiral plot 1516.

The ambiguity between the two spirals is resolved upon interpolating along the spiral 1518 of constant â, which selects the sinusoid and spiral shown in the lower row 1520 of FIG. 15A. FIG. 15B shows an example in which $F_{test}$ is just above the Nyquist rate for the sinusoid. Interpolation along each arm of the five-armed spiral 1548 corresponds to interpolation along five shifted sinusoids $S_1$, $S_2$, $S_3$, $S_4$, $S_5$, of period â. In both cases, selecting â is useful, because, unlike a, â depends sensitively on $F_o$.

Sinusoid Sampled Above but Near Nyquist Rate

Continuing special case 2, alias frequencies are not expected for the condition $F_{test}=mF_o(1-\alpha)$, as long as m and $\alpha$ are chosen so that $F_{test}\geq 2F_o$. The sampling is sufficient to unambiguously determine the period a-of the underlying sinusoid. However, the patterns 1410a, 1410b, 1420a, 1420b, 1420c shown in FIG. 14 that attract the attention of the eye consist of groupings of every $m^{th}$ harmonic. If all but every $m^{th}$ harmonic were completely removed (for example, n=m, 2m, 3m, ... or n=m+1, 2m+1, 3m+1, ... ), the sampling period would drop by a factor of m, bringing the sampling rate below the Nyquist rate. The method for calculating the alias period for the separated sub-set of harmonics is the same as in the previous section. One subset of harmonics transforms to a single spiral arm that is part of an m-armed spiral whose constant of proportionality is equal to the new alias period as shown in FIG. 15B. As long as each arm is treated independently, the m groups of harmonics (the spiral arms) correspond to m shifted sinusoids. This provides a model for the patterns 1410a, 1410b, 1420a, 1420b, 1420c shown in the left column 1401 of FIG. 14.

Cutting Across the Underlying Curves

Audio signals often contain more than one set of harmonics. For example, two harmonic series with two different fundamental frequencies may be present in the spectrum when the test fundamental, $F_{test}$, is chosen to be well above both of these fundamentals. The second harmonic series only increases the density of sampling and further nails down the value of the period, a. However, when attempting to differentiate between the fundamental frequencies, the value of the period a does not provide the necessary information to differentiate the frequencies. Visually, it is evident that it is not the underlying sinusoid but the effects related to visual dissonance—that is, the patterns shown in FIG. 14—which appear to change rapidly with either $F_o$ or $F_{test}$.

Additional points may be interpolated along the spiral paired with an alias sinusoid, effectively cutting across the underlying curve. The choice of a transformation that increases the proximity of points along the alias sinusoid facilitates performing this interpolation. Cutting across the underlying curve forces a choice between the constants of proportionality, a and â. Then, the extremely sensitive dependence of â on $F_{test}$ makes it a useful diagnostic of fundamental frequency. For example, $\hat{a}=a/\alpha$ becomes infinite as $F_{test}$ passes through $F_o$.

Figure 14:
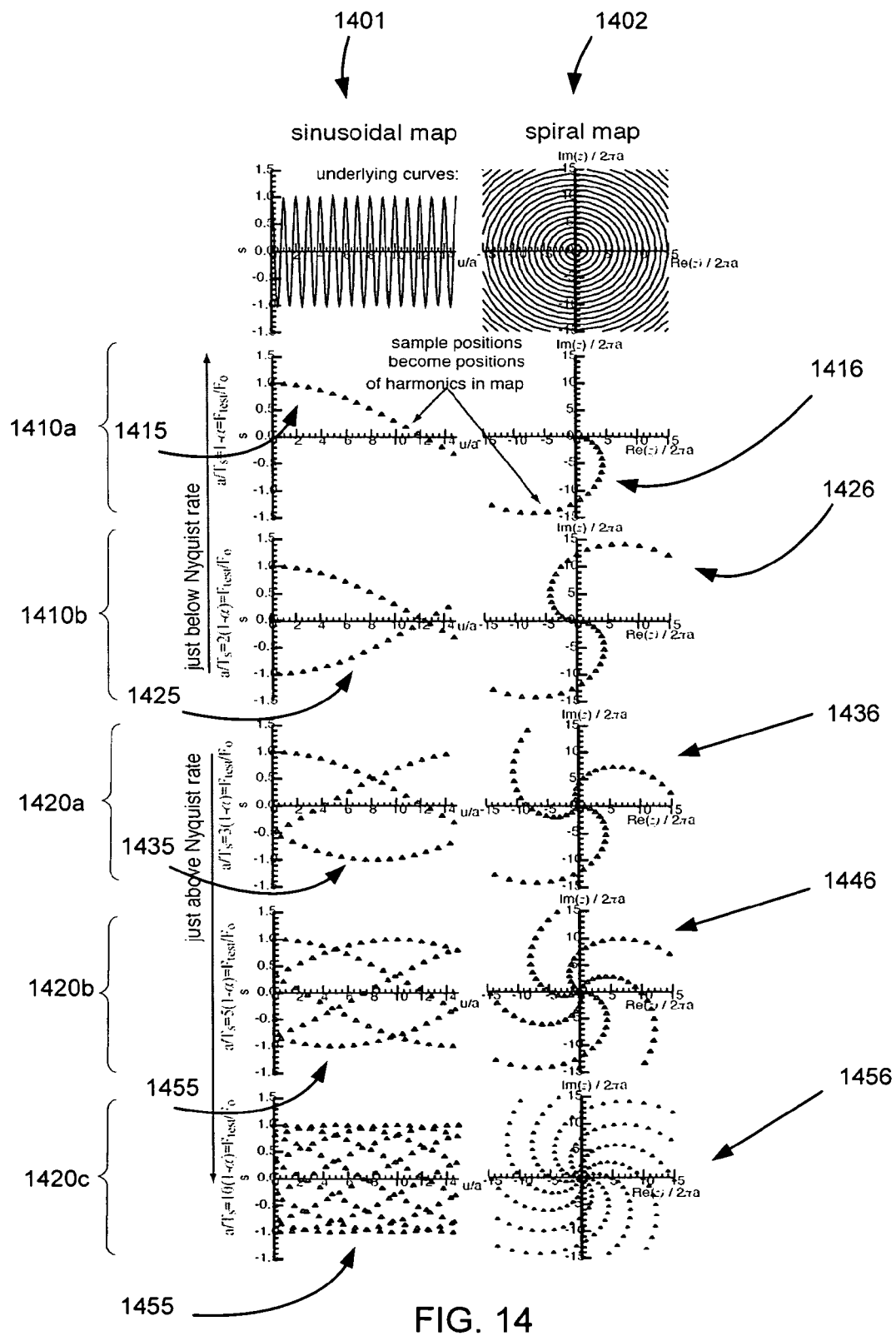
FIG. 14 illustrates scan sequences to view groups of sinusoids and corresponding spiral features in accordance with the present invention.

Note that when the eye follows the points of close proximity shown in either column 1401, 1402 of FIG. 14, the eye is traveling along the curves just specified which cut across the original, underlying curves. The eye is tracking changes in â as the curves move (in either map). The eye can easily separate more than one harmonic series using the maps even without additional interpolation because the eye groups together points of close proximity. Contour plotting algorithms introduce interpolation numerically.

Application—Harmonic and Artifact Tracking

Figure 16:
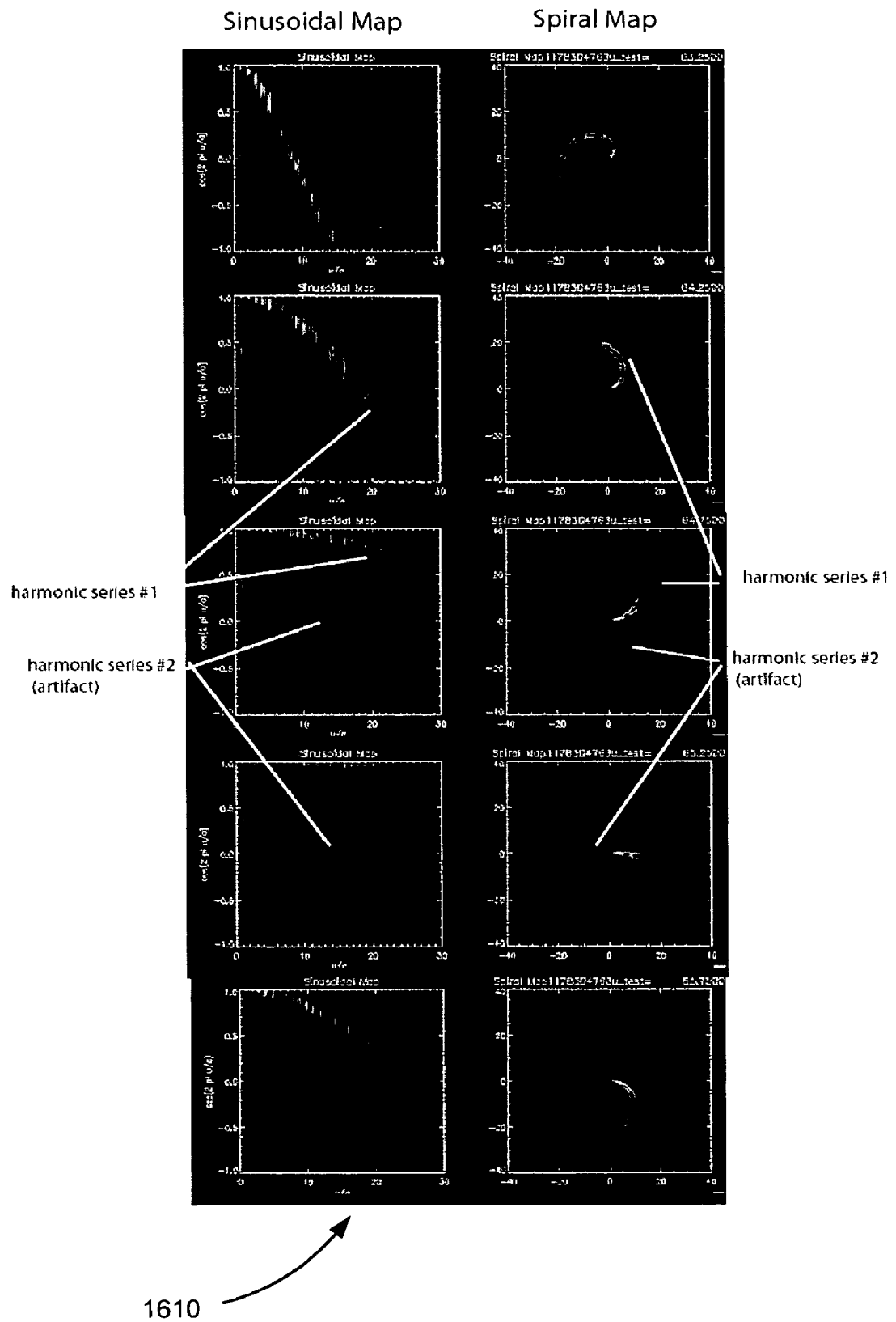
FIG. 16 illustrates harmonic tracking in a spectral analysis of an audio signal in accordance with the present invention.

Harmonic tracking in the spectral analysis of an audio signal may be demonstrated using the spectrum of an organ pitch produced with a 16 foot flute stop. FIG. 16 shows the spiral map 1610 of the spectrum with the test fundamental, $F_{test}$, set near 65 Hz. The nominal fundamental frequency of the note C is 65.4 Hz. According to special case 1, the harmonics are expected to lie near the positive real axis. While the expected harmonic series passes through the real axis, a second pattern appears in a different part of the plane. The plot of the spiral map 1610 shows a grouping of harmonics passing through the real axis, but also shows a second set grouped into another spiral. An $F_{test}$ scan revealed that this set of harmonics moved to the positive real axis when $F_{test}$ was just above 69 Hz, which is the fundamental frequency of the note, C sharp. The second pitch could have been in this data set due to the reverberation characteristics of the recording hall.

Similar analysis has identified the presence of and spatially separated harmonics of the line frequency, 60 Hz, from the main spectral sequence and has been used to scan for harmonics present in office background noise.

Note also that the sinusoidal map applied to spectra containing an inharmonic sequence, such as that described by Equation 3 (rather than pure harmonics) will have a chirp in â. Different inharmonicities correspond to different chirp rates. The sinusoidal map of a frequency spectrum can be used in this way to produce a sonification of the timbre of a musical instrument. Rather than converting image data to a serial data set and using the intensity to create a function of time from the intensity, the method of the present invention takes the position of the peaks and maps them onto the positions of the sinusoid. More generally, one may apply the sinusoidal map to any serial data set containing a sequence of peaks, and sonify the data by creating a new signal in which the positions of the sinusoid samples are defined by the positions of the peaks in the data set, rather than by the peak intensities. These signals will respond to the data near and below the Nyquist rate for the underlying sinusoid. In essence, one would be listening to the alias and not the underlying sinusoid. For example, a harmonic series in a spectrum would produce a pure tone. Below the condition $F_{test}=F_o$, the pure tone would vary in frequency during a scan of $F_{test}$. Well above the condition $F_{test}=F_o$, the pure tone would be that of the underlying sinusoid and would not change because the underlying sinusoid would be sampled at a rate that satisfies the Nyquist criterion.

Two-Dimensional Data Analysis—Microscopy Images

The system and method of the present invention may be extended by substituting two-dimensional blocks (or arrays of data) for the parallel lines. Each two dimensional block of data is repeated vertically n times. A target sequence of shift values is defined that is a function of n and other parameters (the model). The $n^{th}$ block is shifted downward so that it intercepts the x-axis at the $n^{th}$ value of a target sequence of shift values. If there is a pattern in the data that agrees or conforms to the model, the pattern will lie along the x-axis. When the methods of the present invention are applied to high resolution microscopy images, the methods provide a way to simultaneously view high resolution information (along the y-axis) and macroscopic trends (along the x-axis).

An example is shown in FIG. 17A. High resolution images of an optical grating were acquired with a scanning electron microscope. A typical image 1791 is shown in FIG. 17A. A large number of additional high resolution images (not shown) were acquired, each starting at the right edge of the previous image. A panoramic image was formed by stitching these images together, forming a new image. In the example, thirty copies of the panoramic image were made and rotated such that the thirty copies were all parallel to the y axis, intercepting the y axis at x=n, where n=1 to 30. Each copy was shifted downward by an amount y_shift(n), forming the image 1795 shown in FIG. 17B. In this example, the shift was y_shift(n)=n x (test groove period). Motion was introduced by varying the test groove period. FIG. 17B shows the deviation between the groove periodicity and the model, and the presence of an artifact in the sample (error in groove spacing). By comparing images taken with different types of microscopes (such as atomic force microscopes (AFM), scanning electron microscopes (SEM), scanning tunneling microscopes (STM), and the like) this technique may be used to separate certain types of artifacts that are unique to the particular microscope used in the images and those that are characteristic of the sample.

When the data is in the form of a three dimensional array (a volume with a value at each point in the volume), each volume is replicated multiple times so that each copy is centered about one of a set of parallel lines that that crosses the x-y plane as a grid. A target set of shift values is defined for each position on the grid. Each volume in the grid is then shifted so that it that intercepts the x-y plane using the target shift values. Scanning the definition of the target shift values produces motion. The resulting animated volume may be viewed in 3-D, or a 2-D animated slice of the volume may be viewed.

3-D animations of serial data sets, such as frequency spectra, may also be created in a similar manner. Each frequency axis is replicated multiple times so that each copy lies along one of a set of parallel lines in 3-D that cross the x-y plane as a grid. A target set of shift values is defined for each position on the grid. Each line in the grid is then shifted so that it intercepts the x-y plane using the target shift values. Scanning the definition of the target shift values produces motion. The resulting animated volume may be viewed in 3-D, or a 2-D animated slice of the volume may be viewed.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

The claimed invention is:

1. A method of transforming a frequency spectrum data set from a frequency space to an animated rectangular coordinate space, the method comprising:
    mapping a frequency axis onto a curve, including:
        replicating the frequency spectrum into a plurality of lines;
        aligning the plurality of lines in parallel in the rectangular coordinate space such that the last line intercepts the horizontal axis of the rectangular coordinate space at a horizontal coordinate equal to the number of the plurality of lines;
        shifting each line by an amount that is a function of the number of lines in the plurality of lines to map a target spectral sequence along the horizontal axis of the rectangular coordinate space;
    mapping a value of a function of the frequency spectrum data set onto a third dimensional axis of the rectangular coordinate space;
    scanning a parameter of the frequency spectrum to produce an animated contour plot sequence in the rectangular coordinate space.

2. The method of claim 1, wherein the curve is displayed in an x-y plane with a horizontal x-axis and a vertical y-axis.

3. The method of claim 2, wherein the vertical y-axis is limited to avoid redundancy in the contour plot sequence.

4. The method of claim 2, wherein a target spectral peak sequence is mapped along the x-axis.

5. The method of claim 4, wherein additional target spectral peak sequences are positioned consecutively along the x-axis.

6. The method of claim 1, wherein the plurality of lines are of equal length.

7. The method of claim 1, wherein the function of the frequency spectrum is at least one of Fourier transform amplitude, phase, power, or spectral density and each line is further shifted by an amount that is a function of the frequency spectrum.

8. The method of claim 1, wherein the plurality of lines are aligned vertically.

9. A system for transforming a frequency spectrum data set from a frequency space to an animated rectangular coordinate space, the system comprising:
- a computer system, the computer system including a plurality of modules including:
- a frequency axis mapping module that maps a frequency axis onto a curve, including:
  - a curve definition module that replicates the frequency spectrum into a plurality of lines, the plurality of lines including at least a first line and a last line;
  - a shifting module that aligns the plurality of lines in parallel in the rectangular coordinate space such that the last line intercepts the horizontal axis of the rectangular coordinate space at a horizontal coordinate equal to the number of the plurality of lines and wherein each line is shifted by an amount that is a function of the number of lines;
- a frequency function mapping module that maps a value of a function of the frequency spectrum data set onto a third dimensional axis of the rectangular coordinate space;
- a scanning module that scans a parameter of the frequency spectrum to produce an animated contour plot sequence in the rectangular coordinate space.

10. The system of claim 9, wherein the frequency axis mapping module displays the curve in an x-y plane with a horizontal x-axis and a vertical y-axis.

11. The system of claim 10, wherein the frequency axis mapping module further maps a target spectral peak sequence along the x-axis.

12. The system of claim 9, wherein the frequency axis mapping module further positions additional target spectral peak sequences consecutively along the x-axis.

13. The system of claim 9, wherein the plurality of lines replicated by the curve definition module are of equal length.

14. The system of claim 9, wherein the frequency function mapping module maps the function of the frequency spectrum that is at least one of Fourier transform amplitude, phase, power, or spectral density.

15. A computer program product comprising a non-transitory computer readable medium, the non-transitory compute readable medium including computer-executable instructions for transforming a frequency spectrum data set from a frequency space to an animated rectangular coordinate space, the computer-executable instructions comprising:
- instructions for mapping a frequency axis onto a curve, including:
  - instructions for replicating the frequency spectrum into a plurality of lines;
  - instructions for aligning the plurality of lines in parallel in the rectangular coordinate space such that the last line intercepts the horizontal axis of the rectangular coordinate space at a horizontal coordinate equal to the number of the plurality of lines;
  - instructions for shifting each line by an amount that is a function of the number of lines in the plurality of lines to map a target spectral sequence along the horizontal axis of the rectangular coordinate space;
- instructions for mapping a value of a function of the frequency spectrum onto a third dimensional axis of the rectangular coordinate space;
- instructions for scanning a parameter of the frequency spectrum to produce an animated contour plot sequence in the rectangular coordinate space.

16. The computer program product of claim 15, wherein the instructions for mapping a frequency axis onto a curve further include instructions for displaying the curve in an x-y plane with a horizontal x-axis and a vertical y-axis.

17. The computer program product of claim 16, wherein the instructions for mapping a frequency axis onto a curve further include instructions for mapping a target spectral peak sequence along the x-axis.

18. The computer program product of claim 17, wherein the instructions for mapping a target spectral peak sequence along the x-axis further include instructions for positioning additional target spectral peak sequences consecutively along the x-axis.

19. The computer program product of claim 15, wherein the instructions for replicating the frequency spectrum into a plurality of lines further include instructions for replicating the frequency spectrum into a plurality of lines of equal length.

20. The computer program product of claim 15, wherein the function of the frequency spectrum is at least one of Fourier transform amplitude, phase, power, or spectral density.

* * * * *